US 12,420,178 B2

(12) United States Patent
Guerrero

(10) Patent No.: US 12,420,178 B2
(45) Date of Patent: Sep. 23, 2025

(54) EXTENDABLE CONTROLLER

(71) Applicant: Razer (Asia-Pacific) Pte. Ltd., Singapore (SG)

(72) Inventor: Gil Jr Palma Guerrero, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/842,237

(22) PCT Filed: Mar. 11, 2022

(86) PCT No.: PCT/SG2022/050126
§ 371 (c)(1),
(2) Date: Aug. 28, 2024

(87) PCT Pub. No.: WO2023/172191
PCT Pub. Date: Sep. 14, 2023

(65) Prior Publication Data
US 2025/0099847 A1 Mar. 27, 2025

(51) Int. Cl.
*A63F 13/24* (2014.01)
*A63F 13/92* (2014.01)
*A63F 13/98* (2014.01)

(52) U.S. Cl.
CPC .............. *A63F 13/24* (2014.09); *A63F 13/92* (2014.09); *A63F 13/98* (2014.09)

(58) Field of Classification Search
CPC .................................. A63F 13/24; A63F 13/92
See application file for complete search history.

(56) References Cited

U.S. PATENT DOCUMENTS 7,833,097 B1   11/2010   Maddox et al.
8,529,357 B2    9/2013   Joynes et al.
(Continued)

FOREIGN PATENT DOCUMENTS

CN    204380232 U    6/2015
CN    105101702 A   11/2015
(Continued)

OTHER PUBLICATIONS

Bluetooth Game Controller Wireless Gamepad Telescopic Gamepad Joystick for Mobile Phone Android Game Handle for IOS Android (https://www.sociableweavernest.com/products/bluetooth-game-controller-wireless-gamepad-telescopic-gamepad-joystick-for-mobile-phone-android-game-handle-for-ios-android?variant=42912746668281&currency=INR&utm_medium=product_sync&utm_source=google&utm_content=sag_organi.
(Continued)

*Primary Examiner* — Yingchuan Zhang
(74) *Attorney, Agent, or Firm* — Polsinelli PC

(57) ABSTRACT

An extendable controller having a first handle part; a second handle part; an elongate bridge with a first half in sliding engagement with a first bridge-link portion of the first handle part and a second half in sliding engagement with a second bridge-link portion of the second handle part; and an extendable arrangement to synchronously extend and retract the first handle part and the second handle part uniformly in opposite directions relative to the elongate bridge along an extension axis. The extendable arrangement includes a dual-reciprocating-opposite-motion-carrier system having a first reciprocating carrier, a second reciprocating carrier, an opposite motion mechanism to move the first reciprocating carrier and the second reciprocating carrier in opposite directions with respect to the extension axis, a first elongate member coupling the first handle part to the first recipro-
(Continued)

cating carrier, and a second elongate member coupling the second handle part to the second reciprocating carrier.

19 Claims, 5 Drawing Sheets

(56) References Cited

U.S. PATENT DOCUMENTS

| | | | |
|---|---|---|---|
| 8,788,348 | B2 | 7/2014 | Joynes et al. |
| 8,812,987 | B2 | 8/2014 | Joynes et al. |
| 8,944,912 | B2 | 2/2015 | Joynes et al. |
| 8,944,913 | B2 | 2/2015 | Joynes et al. |
| 9,005,025 | B2 | 4/2015 | Joynes et al. |
| 9,005,026 | B2 | 4/2015 | Joynes et al. |
| 9,114,319 | B2 | 8/2015 | Joynes et al. |
| 9,126,119 | B2 | 9/2015 | Joynes et al. |
| 9,407,100 | B2 | 8/2016 | Joynes et al. |
| 9,592,452 | B2 | 3/2017 | Townley et al. |
| 9,592,453 | B2 | 3/2017 | Townley et al. |
| 9,757,649 | B2 | 9/2017 | Townley et al. |
| 9,764,231 | B2 | 9/2017 | Townley et al. |
| 9,808,713 | B1 | 11/2017 | Townley et al. |
| 9,839,842 | B2 | 12/2017 | Townley et al. |
| 9,841,786 | B2 | 12/2017 | Townley et al. |
| 9,841,824 | B2 | 12/2017 | Townley et al. |
| 9,855,498 | B2 | 1/2018 | Townley et al. |
| 10,092,830 | B2 | 10/2018 | Townley et al. |
| 10,159,895 | B2 | 12/2018 | Townley et al. |
| 10,391,393 | B2 | 8/2019 | Townley et al. |
| 10,868,436 | B1 | 12/2020 | Chen et al. |
| 2008/0311963 | A1 | 12/2008 | Strawn |
| 2015/0031452 | A1 | 1/2015 | Rundell et al. |
| 2015/0092346 | A1 | 4/2015 | Ben et al. |
| 2017/0128830 | A1 | 5/2017 | Fujita et al. |
| 2017/0182410 | A1 | 6/2017 | Townley et al. |
| 2020/0398170 | A1 | 12/2020 | McDole et al. |
| 2021/0275907 | A1 | 9/2021 | Khaira et al. |
| 2021/0370164 | A1 | 12/2021 | Lu et al. |
| 2022/0032178 | A1 | 2/2022 | Khaira et al. |
| 2022/0032179 | A1 | 2/2022 | Khaira et al. |

FOREIGN PATENT DOCUMENTS

| | | | |
|---|---|---|---|
| CN | 204973067 U | | 1/2016 |
| CN | 205510174 U | * | 8/2016 |
| CN | 206411846 U | | 8/2017 |
| CN | 207667130 U | | 7/2018 |
| CN | 207838250 U | | 9/2018 |
| CN | 208990202 U | | 6/2019 |
| CN | 110478894 A | | 11/2019 |
| CN | 211561819 U | | 9/2020 |
| CN | 211912693 U | | 11/2020 |
| CN | 212141443 U | | 12/2020 |
| CN | 212677220 U | | 3/2021 |
| CN | 112973111 A | | 6/2021 |
| CN | 213313306 U | | 6/2021 |
| CN | 216046252 U | | 3/2022 |
| KR | 10-2011-0081018 A | | 7/2011 |
| KR | 10-2017-0068204 A | | 6/2017 |
| WO | 2004/007041 A2 | | 1/2004 |

OTHER PUBLICATIONS

ElementDigital (https://www.amazon.com/ElementDigital-Controller-Telescopic-Wireless-Bluetooth/dp/B07H3W4XZR).
Razer's Kishi turns your phone into a Nintendo Switch that can play Google Stadia (https://www.theverge.com/21285073/razer-kishi-review-game-controller-phone-price-nintendo-switch-stadia).
International Search Report; dated Nov. 30, 2022; Application # PCT/SG2022/050126.
EP Search Report; Patent Application No. 22931164.2; Dated Mar. 18, 2025.
EP Search Report; Patent Application No. 23767252.2; Dated Mar. 20, 2025.

* cited by examiner

EXTENDABLE CONTROLLER

TECHNICAL FIELD

Embodiments generally relate to an extendable controller, and particularly a symmetrically extendable controller.

BACKGROUND

In the market, game controllers for mobile phones typically include a clamping mechanism for attaching the mobile phone to the respective game controller. Generally, the clamping mechanism uses a single stack slider such that the left controller is being pulled away from the right controller, or vice versa, resulting in asymmetric configuration of the extended single stack slider when the left controller and the right controller are pulled away. Such asymmetric configuration may result in unequal backing support for the mobile phone. Such game controller may also result in wobbly and unstable clamped mobile phone experience for the user, which may cause irritation to the user. Further, such game controller may also not be aesthetically pleasing when in use.

Accordingly, there is a need for a controller that addresses at least some of the issues identified above.

SUMMARY

According to various embodiments, there may be provided an extendable controller including a first handle part having a first bridge-link-portion extending from a first handle-body-portion; a second handle part having a second bridge-link-portion extending from a second handle-body-portion; an elongate bridge with a first half of the elongate bridge in sliding engagement with the first bridge-link portion of the first handle part along a longitudinal axis of the elongate bridge and a second half of the elongate bridge in sliding engagement with the second bridge-link portion of the second handle part along the longitudinal axis of the elongate bridge; and an extendable arrangement interconnecting the elongate bridge, the first handle part and the second handle part in a manner so as to synchronously extend and retract the first handle part and the second handle part uniformly in opposite directions relative to the elongate bridge along an extension axis, the extension axis being parallel to or coincide with the longitudinal axis of the elongate bridge. The extendable arrangement including a dual-reciprocating-opposite-motion-carrier system within the elongate bridge. The dual-reciprocating-opposite-motion carrier system including a first reciprocating carrier movable relative to the elongate bridge along a first carrier-path and within the elongate bridge, a second reciprocating carrier movable relative to the elongate bridge along a second carrier-path and within the elongate bridge, and an opposite motion mechanism interconnecting the first reciprocating carrier and the second reciprocating carrier, the opposite motion mechanism being configured to move the first reciprocating carrier and the second reciprocating carrier in opposite directions with respect to the extension axis of the extendable arrangement. The extendable arrangement further including a first elongate member with a first end portion coupled to the first handle part and a second end portion coupled to the first reciprocating carrier of the dual-reciprocating-opposite-motion-carrier system, and a second elongate member with a first end portion coupled to the second handle part and a second end portion coupled to the second reciprocating carrier of the dual-reciprocating-opposite-motion-carrier system.

According to various embodiments, there may be provided an extendable controller including a first handle part having a first bridge-link-portion extending from a first handle-body-portion; a second handle part having a second bridge-link-portion extending from a second handle-body-portion; an elongate bridge with a first half of the elongate bridge in sliding engagement with the first bridge-link-portion of the first handle part along a longitudinal axis of the elongate bridge and a second half of the elongate bridge in sliding engagement with the second bridge-link-portion of the second handle part along the longitudinal axis of the elongate bridge; and an extendable arrangement interconnecting the elongate bridge, the first handle part and the second handle part in a manner so as to synchronously extend and retract the first handle part and the second handle part uniformly in opposite directions with respect to the elongate bridge along an extension axis, the extension axis being parallel to or coincide with the longitudinal axis of the elongate bridge. The extendable arrangement including a first pulley rotatably coupled to a first end portion of the elongate bridge in a manner so as to be rotatable about a first rotational axis perpendicular to the extension axis, a second pulley rotatably coupled to a second end portion of the elongate bridge in a manner so as to be rotatable about a second rotational axis perpendicular to the extension axis, the second rotational axis being parallel to the first rotational axis, a continuous endless belt looped over the first pulley and the second pulley, a first elongate member disposed parallel to the extension axis with a first end portion coupled to the first handle part and a second end portion coupled to a first segment of the continuous endless belt, and a second elongate member disposed parallel to the extension axis with a first end portion coupled to the second handle part and a second end portion coupled to a second segment of the continuous endless belt, the first segment of the continuous endless belt and the second segment of the continuous endless belt being on opposite sides of the continuous endless belt across the extension axis.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
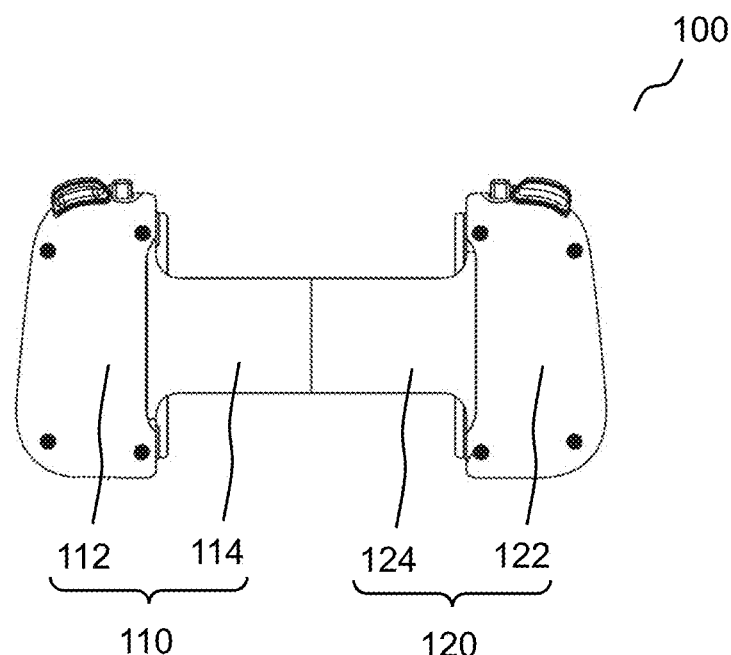
FIG. 1A shows a back view of an extendable controller in a retracted state according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments relate to an extendable controller. In particular, various embodiments relate to a symmetrically extendable controller. According to various embodiments, the controller may be a game controller for a portable electronic device. According to various embodiments, the portable electronic device may include a smartphone, a mobile phones, a tablet, or any suitable handheld, lightweight electronic devices. According to various embodiments, the extendable controller may be configured to be extended or pulled apart so as to receive or retain or hold the portable electronic devices therebetween such that the portable electronic devices may be removably attached or secured or coupled to the extendable controller. According to various embodiments, the extendable controller may be extended or pulled apart in a symmetrical manner such that a middle portion of the extendable controller may remain in the middle regardless of whether the extendable controller is in the retracted state, or is undergoing extension, or is in the extended state. Accordingly, two opposite side portions of the extendable controller on opposite sides of the middle portion of the extendable controller may be extended (or pulled apart) and retracted in a synchronous (or simultaneous) and uniform (or symmetric) manner relative to the middle portion such that the middle portion may remain in the middle at all times.

The following examples pertain to various embodiments.

Example 1 is an extendable controller including:
a first handle part having a first bridge-link-portion extending from a first handle-body-portion;
a second handle part having a second bridge-link-portion extending from a second handle-body-portion;
an elongate bridge with a first half of the elongate bridge in sliding engagement with the first bridge-link portion of the first handle part along a longitudinal axis of the elongate bridge and a second half of the elongate bridge in sliding engagement with the second bridge-link portion of the second handle part along the longitudinal axis of the elongate bridge; and
an extendable arrangement interconnecting the elongate bridge, the first handle part and the second handle part in a manner so as to synchronously extend and retract the first handle part and the second handle part uniformly in opposite directions relative to the elongate bridge along an extension axis, the extension axis being parallel to or coincide with the longitudinal axis of the elongate bridge,
wherein the extendable arrangement includes
a dual-reciprocating-opposite-motion-carrier system within the elongate bridge, the dual-reciprocating-opposite-motion carrier system including
a first reciprocating carrier movable relative to the elongate bridge along a first carrier-path and within the elongate bridge,
a second reciprocating carrier movable relative to the elongate bridge along a second carrier-path and within the elongate bridge, and
an opposite motion mechanism interconnecting the first reciprocating carrier and the second reciprocating carrier, the opposite motion mechanism being configured to move the first reciprocating carrier and the second reciprocating carrier in opposite directions with respect to the extension axis of the extendable arrangement,
a first elongate member with a first end portion coupled to the first handle part and a second end portion coupled to the first reciprocating carrier of the dual-reciprocating-opposite-motion-carrier system, and
a second elongate member with a first end portion coupled to the second handle part and a second end portion coupled to the second reciprocating carrier of the dual-reciprocating-opposite-motion-carrier system.

In Example 2, the subject matter of Example 1 may optionally include that the first carrier-path and the second carrier-path may be parallel to the extension axis and on opposite sides of the extension axis.

In Example 3, the subject matter of Example 2 may optionally include that the first carrier-path and the second carrier-path may be equal in length and aligned to each other.

In Example 4, the subject matter of any one of Examples 1 to 3 may optionally include that the opposite motion mechanism may include
a first pulley rotatably coupled to a first end portion of the elongate bridge in a manner so as to be rotatable about a first rotational axis perpendicular to the extension axis,
a second pulley rotatably coupled to a second end portion of the elongate bridge in a manner so as to be rotatable about a second rotational axis perpendicular to the extension axis, the second rotational axis being parallel to the first rotational axis, and
a continuous endless belt looped over the first pulley and the second pulley,
wherein the first reciprocating carrier is at a first segment of the continuous endless belt and the second reciprocating carrier is at a second segment of the continuous endless belt, the first segment of the continuous endless belt and the second segment of the continuous endless belt being on opposite sides of the opposite motion mechanism across the extension axis.

In Example 5, the subject matter of Example 4 may optionally include that the first elongate member may be parallel to the extension axis, and the second elongate member is parallel to the extension axis.

In Example 6, the subject matter of Example 5 may optionally include
- a first guide pin disposed at the first end portion of the elongate bridge, and
- a second guide pin disposed at the second end portion of the elongate bridge,
- wherein the first elongate member may include an elongate slot extending longitudinally along a length of the first elongate member, and the first guide pin may be fitted through the elongate slot of the first elongate member to guide a longitudinal movement of the first elongate member,
- wherein the second elongate member may include an elongate slot extending longitudinally along a length of the second elongate member, and the second guide pin may be fitted through the elongate slot of the second elongate member to guide a longitudinal movement of the second elongate member.

In Example 7, the subject matter of any one of Examples 4 to 6 may optionally include that the continuous endless belt may be a toothed belt, and wherein each of the first pulley and the second pulley may be a toothed pulley.

In Example 8, the subject matter of any one of Examples 4 to 7 may optionally include that the continuous endless belt may be made of thermoplastic polyurethane (TPU), polyurethane (PU), or styrene-ethylene-butylene-styrene (SEBS).

In Example 9, the subject matter of any one of Examples 1 to 8 may optionally include that
- the first reciprocating carrier may include an interlocking arrangement and the second end portion of the first elongate member may include a complementary interlocking arrangement, wherein the interlocking arrangement of the first reciprocating carrier and the complementary interlocking arrangement of the first elongate member may be interlocked with each other so as to couple the second end portion of the first elongate member to the first reciprocating carrier, and the second reciprocating carrier may include an interlocking arrangement and
- the second end portion of the second elongate member may include a complementary interlocking arrangement, wherein the interlocking arrangement of the second reciprocating carrier and the complementary interlocking arrangement of the second elongate member may be interlocked with each other so as to couple the second end portion of the second elongate member to the second segment of the continuous endless belt.

In Example 10, the subject matter of Example 9 may optionally include that the interlocking arrangement of the first reciprocating carrier may be a protrusion and the complementary interlocking arrangement of the first elongate member may be a notch, and the interlocking arrangement of the second reciprocating carrier may be a protrusion and the complementary interlocking arrangement of the second elongate member may be a notch.

In Example 11, the subject matter of any one of Examples 1 to 10 may optionally include that the extendable arrangement may further include a first biasing element connected between the first handle part and the first end portion of the elongate bridge, the first biasing element being configured to bias against extending the first handle part from the elongate bridge along the extension axis, and a second biasing element connected between the second handle part and the second end portion of the elongate bridge, the second biasing element being configured to bias against extending the second handle part from the elongate bridge along the extension axis.

In Example 12, the subject matter of Example 11 may optionally include that each of the first biasing element and the second biasing element may be a tension spring or extension spring.

In Example 13, the subject matter of Example 11 or 12 may optionally include that the first biasing element and the first reciprocating carrier may be on opposite sides of the opposite motion mechanism with respect to the extension axis, and the second biasing element and the second reciprocating carrier may be on opposite sides of the opposite motion mechanism with respect to the extension axis.

In Example 14, the subject matter of any one of Examples 1 to 13 may optionally include that the first bridge-link-portion may be of a sleeve-like structure fitted over the first half of the elongate bridge, and the second bridge-like-portion may be of a sleeve-like structure fitted over the second half of the elongate bridge.

In Example 15, the subject matter of any one of Examples 1 to 14 may optionally include an electrical cable extending between the first handle part and the second handle part.

In Example 16, the subject matter of Example 15 may optionally include that the electrical cable may extend along the first bridge-link-portion, the elongate bridge and the second bridge-link portion.

In Example 17, the subject matter of Example 15 or 16 may optionally include that the electrical cable may include a flexible flat cable, a flexible cable, a ribbon cable, a coaxial cable, or a wire.

Example 18 is an extendable controller including:
- a first handle part having a first bridge-link-portion extending from a first handle-body-portion;
- a second handle part having a second bridge-link-portion extending from a second handle-body-portion;
- an elongate bridge with a first half of the elongate bridge in sliding engagement with the first bridge-link-portion of the first handle part along a longitudinal axis of the elongate bridge and a second half of the elongate bridge in sliding engagement with the second bridge-link-portion of the second handle part along the longitudinal axis of the elongate bridge; and
- an extendable arrangement interconnecting the elongate bridge, the first handle part and the second handle part in a manner so as to synchronously extend and retract the first handle part and the second handle part uniformly in opposite directions with respect to the elongate bridge along an extension axis, the extension axis being parallel to or coincide with the longitudinal axis of the elongate bridge,
- wherein the extendable arrangement includes
  - a first pulley rotatably coupled to a first end portion of the elongate bridge in a manner so as to be rotatable about a first rotational axis perpendicular to the extension axis,
  - a second pulley rotatably coupled to a second end portion of the elongate bridge in a manner so as to be rotatable about a second rotational axis perpendicular to the extension axis, the second rotational axis being parallel to the first rotational axis,
  - a continuous endless belt looped over the first pulley and the second pulley, a first elongate member disposed parallel to the extension axis with a first end portion coupled to the first handle part and a second end portion coupled to a first segment of the continuous endless belt, and a second elongate member disposed parallel to the extension axis with a first end portion coupled to the second handle part and a second end portion coupled to a second segment of the continuous endless belt, the first segment of the continuous endless belt and the second segment of the continuous endless belt being on opposite sides of the continuous endless belt across the extension axis.

In Example 19, the subject matter of Example 18 may optionally include that the extendable arrangement may further include a first biasing element connected between the first handle part and the first end portion of the elongate bridge, the first biasing element being configured to bias against extending the first handle part from the elongate bridge along the extension axis, and a second biasing element connected between the second handle part and the second end portion of the elongate bridge, the second biasing element being configured to bias against extending the second handle part from the elongate bridge along the extension axis.

In Example 20, the subject matter of Example 18 or 19 may optionally include that each of the first biasing element and the second biasing element may be a tension spring or extension spring.

In Example 21, the subject matter of any one of Examples 18 to 20 may optionally include that the first segment of the continuous endless belt may include an interlocking arrangement and the second end portion of the first elongate member may include a complementary interlocking arrangement, wherein the interlocking arrangement of the first segment of the continuous endless belt and the complementary interlocking arrangement of the first elongate member may be interlocked with each other so as to couple the second end portion of the first elongate member to the first segment of the continuous endless belt, and the second segment of the continuous endless belt may include an interlocking arrangement and the second end portion of the second elongate member may include a complementary interlocking arrangement, wherein the interlocking arrangement of the second segment of the continuous endless belt and the complementary interlocking arrangement of the second elongate member may be interlocked with each other so as to couple the second end portion of the second elongate member to the second segment of the continuous endless belt.

In Example 22, the subject matter of Example 21 may optionally include that the interlocking arrangement of the first segment of the continuous endless belt may include a protrusion and the complementary interlocking arrangement of the first elongate member may include a notch, and the interlocking arrangement of the second segment of the continuous endless belt may include a protrusion and the complementary interlocking arrangement of the second elongate member may include a notch.

In Example 23 the subject matter of any one Examples 18 to 22 may optionally include that the continuous endless belt may be a toothed belt, and each of the first pulley and the second pulley may be a toothed pulley.

In Example 24, the subject matter of any one of Examples 18 to 23 may optionally include a first guide pin disposed at the first end portion of the elongate bridge, and a second guide pin disposed at the second end portion of the elongate bridge, wherein the first elongate member may include an elongate slot extending longitudinally along a length of the first elongate member, and the first guide pin is fitted through the elongate slot of the first elongate member to guide a longitudinal movement of the first elongate member, wherein the second elongate member may include an elongate slot extending longitudinally along a length of the second elongate member, and the second guide pin is fitted through the elongate slot of the second elongate member to guide a longitudinal movement of the second elongate member.

In Example 25, the subject matter of any one of Examples 18 to 24 may optionally include the first bridge-link-portion may be of a sleeve-like structure fitted over the first half of the elongate bridge, and the second bridge-like-portion may be of a sleeve-like structure fitted over the second half of the elongate bridge.

In Example 26, the subject matter of any one of Examples 18 to 25 may optionally include an electrical cable extending between the first handle part and the second handle part.

In Example 27, the subject matter of Example 26 may optionally include that the electrical cable may extend along the first bridge-link-portion, the elongate bridge and the second bridge-link portion.

In Example 28, the subject matter of Example 26 or 27 may optionally include that the electrical cable may include a flexible flat cable, a flexible cable, a ribbon cable, a coaxial cable, or a wire.

Figure 1B:
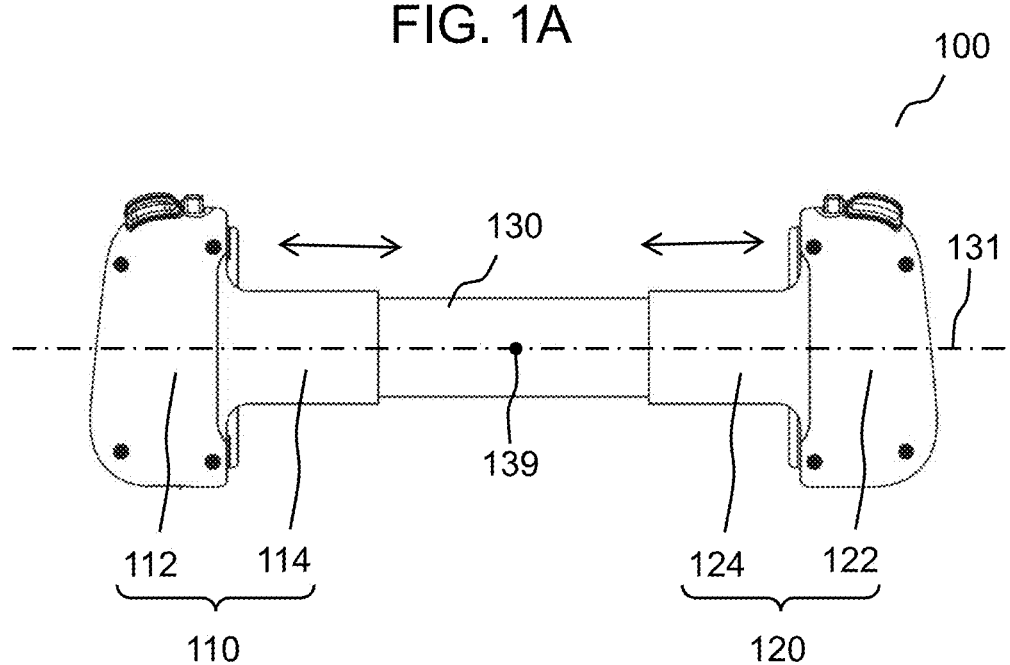
FIG. 1B shows a back view of the extendable controller of FIG. 1A in an extended state according to various embodiments.

FIG. 1A shows a back view of an extendable controller 100 in a retracted state according to various embodiments. FIG. 1B shows a back view of the extendable controller 100 of FIG. 1A in an extended state according to various embodiments. According to various embodiments, the extendable controller 100 may include a first handle part 110 and a second handle part 120. According to various embodiments, the extendable controller 100 may include an elongate bridge 130 disposed between the first handle part 110 and the second handle part 120. According to various embodiments, the elongate bridge 130 may be a long structure serving as an intermediate piece bridging (or bringing together) the first handle part 110 and the second handle part 120. The first handle part 110 may be in sliding engagement with a first half of the elongate bridge 130 so as to be slidable relative to the elongate bridge 130 along a longitudinal axis of the elongate bridge 130, and the second handle part 120 may be in sliding engagement with a second half of the elongate bridge 130 so as to be slidable relative to the elongate bridge 130 along the longitudinal axis of the elongate bridge 130. According to various embodiments, the first half of the elongate bridge 130 may be half of a length of the elongate bridge and the second half of the elongate bridge 130 may other half of the length of the elongate bridge. According to various embodiments, the first handle part 110 and the second handle part 120 may be slidden away from each other in a synchronous (or simultaneous) and uniform (or symmetric) manner relative to the elongate bridge 130 such that a mid-point 139 of the elongate bridge 130 may remain at a middle of the extendable controller 100 regardless of whether the extendable controller 100 is in the retracted state, or is undergoing extension, or is in the extended state. Similarly, the first handle part 110 and the second handle part 120 may be slidden towards each other in a synchronous and uniform manner relative to the elongate bridge 130 when retracting from the extended state to the retracted state. Accordingly, the first handle part 110 and the second handle part 120 may be synchronously (or simultaneously) extended and retracted uniformly (or symmetrically) relative to the elongate bridge 130 in opposite directions with respect to a longitudinal axis 131 of the elongate bridge 130. Hence, during extension, the first handle part 110 and the second handle part 120 may be moved outwards relative to the elongate bridge 130 away from each other in opposite directions, and, during retraction, the first handle part 110 and the second handle part 120 may be moved inwards away towards each other in opposite directions relative to the elongate bridge 130.

According to various embodiments, the first handle part 110 may include a first handle-body-portion 112 and a first bridge-link-portion 114 extending from the first handle-body-portion 112. Accordingly, the first bridge-link-portion 114 may resemble an appendage joined to the first handle-body-portion 112 to form the first handle part 110. According to various embodiments, the second handle part 120 may include a second handle-body-portion 122 and a second bridge-link-portion 124 extending from the second handle-body portion 122. Accordingly, the second bridge-link-portion 124 may resemble an appendage joined to the second handle-body-portion 122 to form the second handle part 120.

According to various embodiments, the first bridge-link-portion 114 of the first handle part 110 may be in sliding engagement with the first half of the elongate bridge 130 such that the first handle part 110 may be slidable relative to the elongate bridge 130 along the longitudinal axis 131 of the elongate bridge 130. Accordingly, in the retracted state, the first bridge-link-portion 114 of the first handle part 110 may overlap with the first half of the elongate bridge 130. Further, in the extended state, the first bridge-link-portion 114 of the first handle part 110 may be extended longitudinally out from the first half of the elongate bridge 130 in a manner such that the first handle-body-portion 112 is moved outwards and away from the elongate bridge 130. Hence, a distance from the first handle-body-portion 112 to the mid-point 139 of the elongate bridge 130 is increased from the retracted state to the extended state.

According to various embodiments, the second bridge-link-portion 124 of the second handle part 120 may be in sliding engagement with the second half of the elongate bridge 130 such that the second handle part 120 may be slidable relative to the elongate bridge 130 along the longitudinal axis 131 of the elongate bridge 130. Accordingly, in the retracted state, the second bridge-link-portion 124 of the second handle part 120 may overlap with the second half of the elongate bridge 130. In the extended state, the second bridge-link-portion 124 of the second handle part 120 may be extended longitudinally out from the second half of the elongate bridge 130 in a manner such that the second handle-body-portion 122 is moved outwards and away from the elongate bridge 130. Hence, a distance from the second handle-body-portion 122 to the mid-point 139 of the elongate bridge 130 is increased from the retracted state to the extended state.

According to various embodiments, when the first handle part 110 and the second handle part 120 are synchronously (or simultaneously) extended out from the elongate bridge 130 in opposite directions, the first bridge-link-portion 114 of the first handle part 110 and the second bridge-link-portion 124 of the second handle part 120 may synchronously (or simultaneously) slide longitudinally away from each other and outwards relative to the elongate bridge 130 in a uniform (or symmetric) manner to lengthen a distance apart between the first handle-body-portion 112 and the second handle-body-portion 122. According to various embodiments, when the first handle part 110 and the second handle part 120 are synchronously (or simultaneously) retracted back relative to the elongate bridge 130 in opposite directions, the first bridge-link-portion 114 of the first handle part 110 and the second bridge-link-portion 124 of the second handle part 120 may synchronously (or simultaneously) slide longitudinally towards each other and inwards relative to the elongate bridge 130 in a uniform (or symmetric) manner to shorten a distance apart between the first handle-body-portion 112 and the second handle-body-portion 122.

Figure 2A:
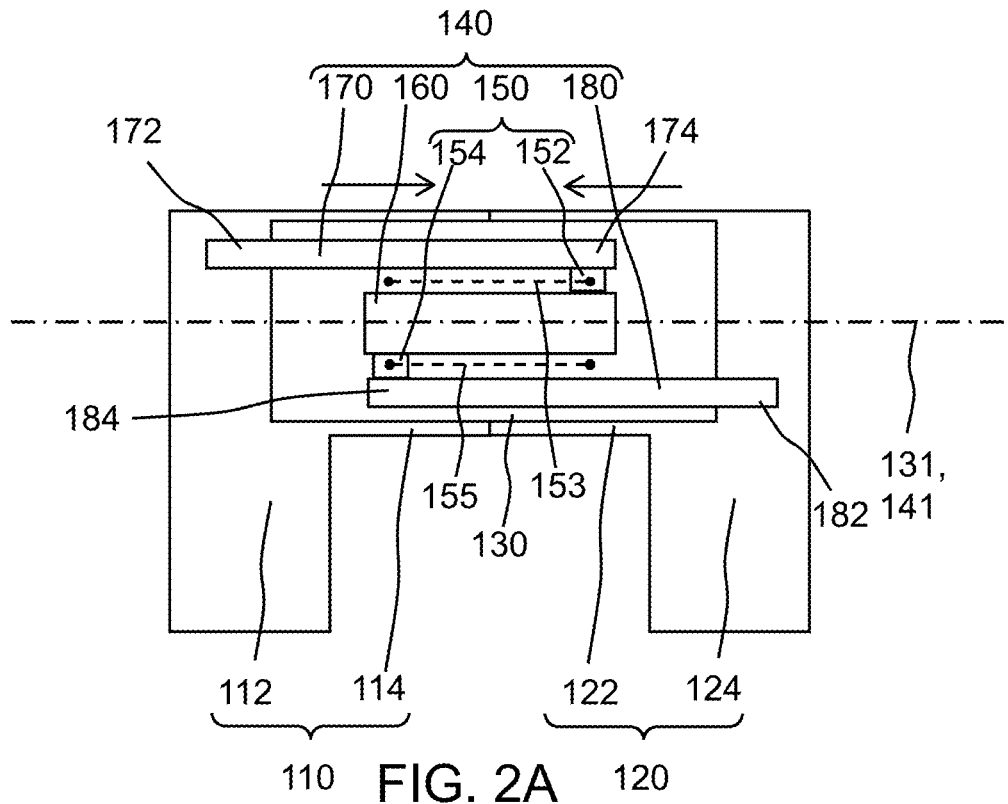
FIG. 2A shows a schematic diagram of the extendable controller of FIG. 1A in the retracted state, with an extendable arrangement illustrated, according to various embodiments.
Figure 2B:
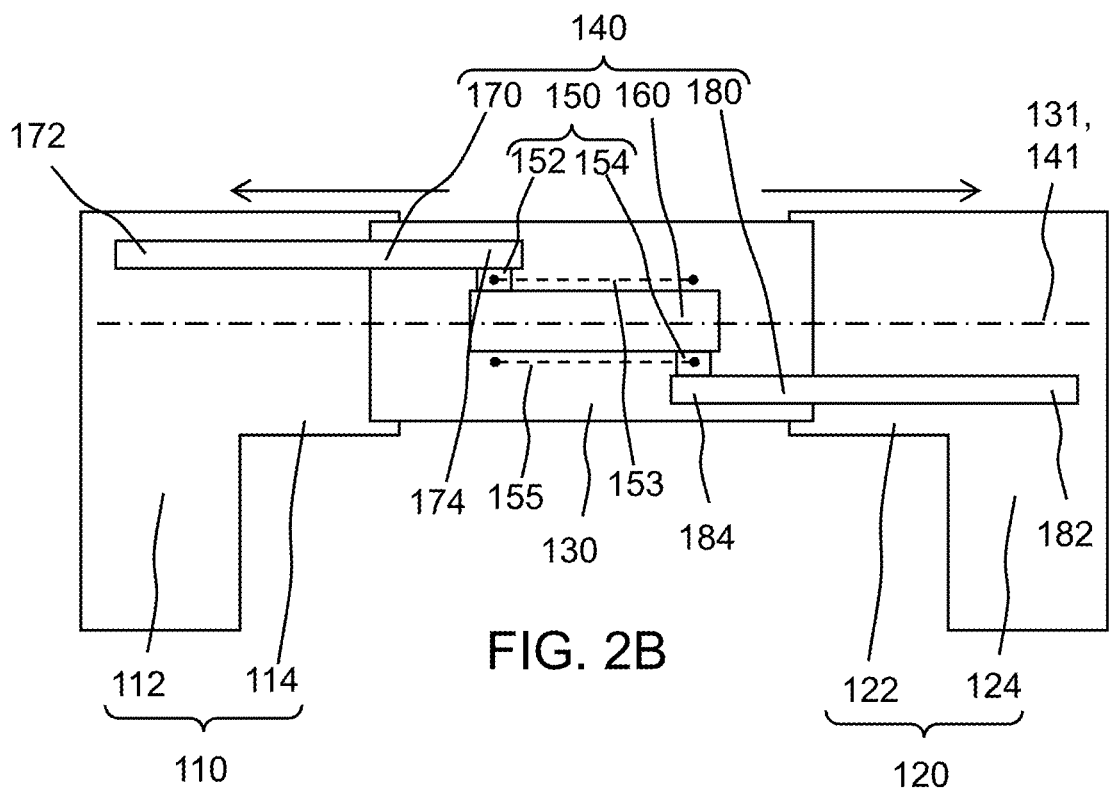
FIG. 2B shows a schematic diagram of the extendable controller of FIG. 2A in the extended state, with the extendable arrangement illustrated, according to various embodiments.

FIG. 2A shows a schematic diagram of the extendable controller 100 in a retracted state, with an extendable arrangement 140 illustrated, according to various embodiments. FIG. 2B shows a schematic diagram of the extendable controller 100 in an extended state, with the extendable arrangement 140 illustrated, according to various embodiments.

According to various embodiments, the extendable controller 100 may include the extendable arrangement 140. According to various embodiments, the extendable arrangement 140 may interconnect the elongate bridge 130, the first handle part 110 and the second handle part 120. According to various embodiments, the extendable arrangement 140 may provide or establish the relationship and/or association among the elongate bridge 130, the first handle part 110 and the second handle part 120 such that they (i.e. the elongate bridge 130, the first handle part 110 and the second handle part 120) may interoperate or cooperatively work together synchronously (or simultaneously) for the extendable controller 100 to be extended (or pulled apart) and retracted in a uniform (or symmetric) manner relative to a center of the extendable controller 100 (e.g. the mid-point 139 of the elongate bridge 130). Accordingly, the extendable arrangement 140 may manage relative movements of the elongate bridge 130, the first handle part 110 and the second handle part 120, and/or cause (or bring about or effect) the motions required for the first handle part 110 and the second handle part 120 to be synchronously (or simultaneously) extended and retracted uniformly (or symmetrically) relative to the elongate bridge 130 in opposite directions along an extension axis 141 of the extendable arrangement 140. The extension axis 141 of the extendable arrangement 140 may be parallel or coincide with the longitudinal axis 131 of the elongate bridge 130. According to various embodiments, when the first handle part 110 is extended from the elongate bridge 130, the extendable arrangement 140 may cause the second handle part 120 to extend from the elongate bridge 130 in tandem with the first handle part 110 to achieve synchronous (or simultaneous) and uniform (or symmetric) extension. Similarly, when the second handle part 120 is extended from the elongate bridge 130, the extendable arrangement may cause the first handle part 110 to extend from the elongate bridge 130 in tandem with the second handle part 120 to achieve synchronous (or simultaneous) and uniform (or symmetric) extension. According to various embodiments, the extendable arrangement 140 may interconnect the elongate bridge 130, the first handle part 110 and the second handle part 120 in a manner so as to synchronously (or simultaneously) extend and retract the first handle part 110 and the second handle part 120 uniformly in opposite directions relative to the elongate bridge 130 along the extension axis 141 of the extendable arrangement 140.

According to various embodiments, the extendable arrangement 140 may include a dual-reciprocating-opposite-motion-carrier system 150. According to various embodiments, the dual-reciprocating-opposite-motion-carrier system 150 may be within the elongate bridge 130. According to various embodiments, various components and/or elements of the dual-reciprocating-opposite-motion-carrier system 150 may be disposed or located within the elongate bridge 130. Accordingly, the dual-reciprocating-opposite-motion-carrier system 150 may be confined or contained within the elongate bridge 130. Further, according to various embodiments, the elongate bridge 130 may support or hold or bear or maintain the dual-reciprocating-opposite-motion-carrier system 150 such that the dual-reciprocating-opposite-motion-carrier system 150 may be operating or running within the elongate bridge 130.

According to various embodiments, the dual-reciprocating-opposite-motion-carrier system 150 may include a first reciprocating carrier 152 and a second reciprocating carrier 154. According to various embodiments, each of the first reciprocating carrier 152 and the second reciprocating carrier 154 may be capable of repetitive forward and backward motion (or back-and-forth motion) relative to the elongate bridge 130. According to various embodiments, the first reciprocating carrier 152 may be movable along a first carrier-path 153 relative to the elongate bridge 130. Accordingly, the first reciprocating carrier 152 may be movable in a reciprocal manner along the first carrier-path 153. According to various embodiments, the first reciprocating carrier 152 may be movable within the elongate bridge 130. Accordingly, the first carrier-path 153 may be within a boundary of the elongate bridge 130 such that the first reciprocating carrier 152 may move within the boundary of the elongate bridge 130. Hence, the first carrier-path 153 may not extend beyond the boundary of the elongate bridge 130. According to various embodiments, the second reciprocating carrier 154 may be movable along a second carrier-path 155 relative to the elongate bridge 130. Accordingly, the second reciprocating carrier 154 may be movable in a reciprocal manner along the second carrier-path 155. According to various embodiments, the second reciprocating carrier 154 may be movable within the elongate bridge 130. Accordingly, the second carrier-path 155 may be within a boundary of the elongate bridge 130 such that the second reciprocating carrier 154 may move within the boundary of the elongate bridge 130. Hence, the second carrier-path 155 may not extend beyond the boundary of the elongate bridge 130.

According to various embodiments, operating the dual-reciprocating-opposite-motion-carrier system 150 may always move the first reciprocating carrier 152 and the second reciprocating carrier 154 synchronously (or simultaneously) in opposite directions with respect to each other and relative to the elongate bridge 130. For example, the first reciprocating carrier 152 and the second reciprocating carrier 154 may synchronously (or simultaneously) move towards each other, pass each other, and away from each other. According to various embodiments, when the dual-reciprocating-opposite-motion-carrier system 150 is in operation, the first reciprocating carrier 152 and the second reciprocating carrier 154 may synchronously (or simultaneously) move in opposite directions with respect to the extension axis 141 of the extendable arrangement 140 (i.e. corresponding to the two opposite directions along the extension axis 141). For example, when the first reciprocating carrier 152 is moving from right to left relative to the elongate bridge 130 with respect to the extension axis 141 of the extendable arrangement 140, the second reciprocating carrier 154 may move from left to right relative to the elongate bridge 130 with respect to the extension axis 141 of the extendable arrangement 140 and in tandem with the movement of the first reciprocating carrier 152. Similarly, when the first reciprocating carrier 152 is moving from left to right relative to the elongate bridge 130 with respect to the extension axis 141 of the extendable arrangement 140, the second reciprocating carrier 154 may move from right to left relative to the elongate bridge 130 with respect to the extension axis 141 of the extendable arrangement 140 and in tandem with the movement of the first reciprocating carrier 152. Hence, the first reciprocating carrier 152 and the second reciprocating carrier 154 may be moved in an alternating manner and opposite to each other synchronously (or simultaneously) relative to the elongate bridge 130.

According to various embodiments, the first reciprocating carrier 152 and the second reciprocating carrier 154 may be synchronously (or simultaneously) and uniformly (or symmetrically) moved in equal and opposite motions or exact opposite motions with respect to each other and relative to the elongate bridge 130. Accordingly, the first reciprocating carrier 152 and the second reciprocating carrier 154 may be moved at a same rate of movement or speed relative to the elongate bridge 130 such that they are moving at a same speed in opposite directions with respect to each other.

According to various embodiments, the dual-reciprocating-opposite-motion-carrier system 150 may include an opposite motion mechanism 160. According to various embodiments, the opposite motion mechanism 160 may interconnect the first reciprocating carrier 152 and the second reciprocating carrier 154. According to various embodiments, the opposite motion mechanism 160 may provide or establish the relationship and/or association between the first reciprocating carrier 152 and the second reciprocating carrier 154 such that the first reciprocating carrier 152 and the second reciprocating carrier 154 may interoperate or cooperatively work together synchronously (or simultaneously) to move in opposite directions with respect to each other and/or with respect to the extension axis 141 of the extendable arrangement 140. Accordingly, the opposite motion mechanism 160 may manage movements of the first reciprocating carrier 152 and the second reciprocating carrier 154 relative to the elongate bridge 130, and/or cause (or bring about or effect) the motions required for the first reciprocating carrier 152 and the second reciprocating carrier 154 to move synchronously (or simultaneously) in opposite directions with respect to each other and/or with respect to the extension axis 141 of the extendable arrangement 140. According to various embodiments, the opposite motion mechanism 160 may be configured to move the first reciprocating carrier 152 and the second reciprocating carrier 154 in opposite directions with respect to each other and/or with respect to the extension axis 141 of the extendable arrangement 140. According to various embodiments, the opposite motion mechanism 160 may be in direct engagement or interaction or contact or connection with each of the first reciprocating carrier 152 and the second reciprocating carrier 154.

According to various embodiments, the opposite motion mechanism 160 may include a reverse motion linkage mechanism, a scissor mechanism, a lever mechanism, a single fixed pulley mechanism, a belt and pulleys mechanism, a double sliders crank mechanism, or any suitable mechanism configured to synchronously (or simultaneously) move the first reciprocating carrier 152 and the second reciprocating carrier 154 in opposite directions with respect to each other and/or with respect to the extension axis 141 of the extendable arrangement 140.

According to various embodiments, the extendable arrangement 140 may include a first elongate member 170. According to various embodiments, a first end portion 172 of the first elongate member 170 may be coupled to the first handle part 110 and a second end portion 174 of the first elongate member 170 may be coupled to the first reciprocating carrier 152 of the dual-reciprocating-opposite-motion-carrier system 150. Accordingly, with the first elongate member 170, the first handle part 110, and the first reciprocating carrier 152 coupled together as a single unitary structure, the first handle part 110 and the first reciprocating carrier 152 may move together as a single unit or complete whole. Hence, moving the first handle part 110 to extend or retract relative to the elongate bridge 130 may move the first reciprocating carrier 152 in a corresponding direction relative to the elongate bridge 130. Similarly, the first handle part 110 may be extended or retracted relative to the elongate bridge 130 when the first reciprocating carrier 152 is moved in the corresponding direction relative to the elongate bridge 130.

According to various embodiments, the extendable arrangement 140 may include a second elongate member 180. According to various embodiments, a first end portion 182 of the second elongate member 180 may be coupled to the second handle part 120 and a second end portion 184 of the second elongate member 180 may be coupled to the second reciprocating carrier 154 of the dual-reciprocating-opposite-motion-carrier system 150. Accordingly, with the second elongate member 180, the second handle part 120, and the second reciprocating carrier 154 coupled together as a single unitary structure, the second handle part 120 and the second reciprocating carrier 154 may move together as a single unit or complete whole. Hence, moving the second handle part 120 to extend or retract relative to the elongate bridge 130 may move the second reciprocating carrier 154 in a corresponding direction relative to the elongate bridge 130. Similarly, the second handle part 120 may be extended or retracted relative to the elongate bridge 130 when the second reciprocating carrier 152 is moved in the corresponding direction relative to the elongate bridge 130.

According to various embodiments, when the opposite motion mechanism 160 is operated in a first operation mode (or forward operation mode), the first reciprocating carrier 152 and the second reciprocating carrier 154 may be respectively operating in a first motion cycle (or forward motion cycle) to move synchronously (or simultaneously) in opposite directions with respect to each other and/or with respect to the extension axis 141 of the extendable arrangement 140. Accordingly, the first reciprocating carrier 152 may be moved in the first motion cycle (e.g. a forward cycle of the reciprocating motion of the first reciprocating carrier 152) relative to the elongate bridge 130. Similarly, the second reciprocating carrier 154 may be moved in the first motion cycle (e.g. a forward cycle of the reciprocating motion of the second reciprocating carrier 154) relative to the elongate bridge 130. The first motion cycle of the first reciprocating carrier 152 and the first motion cycle of the second reciprocating carrier 154 may be opposite to each other relative to the elongate bridge 130. According to various embodiments, synchronously (or simultaneously) moving the first reciprocating carrier 152 and the second reciprocating carrier 154 in the first motion cycle may synchronously (or simultaneously) move the first handle part 110 and the second handle part 120 in opposite directions relative to the elongate bridge 130 to extend the first handle part 110 and the second handle part 120 from the elongate bridge 130 synchronously (or simultaneously). According to various embodiments, the first reciprocating carrier 152 and the second reciprocating carrier 154 may be respectively operating in the first motion cycle (or forward motion cycle) uniformly (or symmetrically). Accordingly, the first reciprocating carrier 152 and the second reciprocating carrier 154 may synchronously (or simultaneously) and uniformly (or symmetrically) move the first handle part 110 and the second handle part 120 in opposite directions relative to the elongate bridge 130 to extend the first handle part 110 and the second handle part 120 from the elongate bridge 130 in a synchronous (or simultaneous) and uniform (or symmetrical) manner.

For example, when the extendable controller 100 is in the retracted state (see FIG. 2A), the first reciprocating carrier 152 may be within the second half of the elongate bridge 130 and the first bridge-link-portion 114 of the first handle part 110 may overlap with the first half of the elongate bridge 130, and the second reciprocating carrier 154 may be within the first half of the elongate bridge 130 and the second bridge-link-portion 124 of the second handle part 120 may overlap with the second half of the elongate bridge 130. During extension of the extendable controller 100, the first reciprocating carrier 152 may move from the second half of the elongate bridge 130 to the first half of the elongate bridge 130 in a manner such that the first elongate member 170 may move the first handle part 110 longitudinally outwards from the first half of the elongate bridge 130 along the extension axis 141. Similarly, during extension of the extendable controller 100, the second reciprocating carrier 154 may move from the first half of the elongate bridge 130 to the second half of the elongate bridge 130 in a manner such that the second elongate member 180 may move the second handle part 120 longitudinally outwards from the second half of the elongate bridge 130 along the extension axis 141. Thus, a direction of movement of the first reciprocating carrier 152 from the second half of the elongate bridge 130 to the first half of the elongate bridge 130 may be opposite to a direction of movement of the second reciprocating carrier 154 from the first half of the elongate bridge 130 to the second half of the elongate bridge 130.

According to various embodiments, when the opposite motion mechanism 160 is operated in a second operation mode (or reverse operation mode), the first reciprocating carrier 152 and the second reciprocating carrier 154 may be respectively operating in a second motion cycle (or reverse motion cycle) to move synchronously (or simultaneously) in opposite directions with respect to each other and/or with respect to the extension axis 141 of the extendable arrangement 140. Accordingly, the first reciprocating carrier 152 may be moved in the second motion cycle (e.g. a reverse cycle of the reciprocating motion of the first reciprocating carrier 152) relative to the elongate bridge 130. Similarly, the second reciprocating carrier 154 may be moved in the second motion cycle (e.g. a reverse cycle of the reciprocating motion of the second reciprocating carrier 154) relative to the elongate bridge 130. The second motion cycle of the first reciprocating carrier 152 and the second motion cycle of the second reciprocating carrier 154 may be opposite to each other relative to the elongate bridge 130. According to various embodiments, synchronously (or simultaneously) moving the first reciprocating carrier 152 and the second reciprocating carrier 154 in the second motion cycle may synchronously (or simultaneously) move the first handle part 110 and the second handle part 120 in opposite directions relative to the elongate bridge 130 to retract the first handle part 110 and the second handle part 120 with respect to the elongate bridge 130 synchronously (or simultaneously). According to various embodiments, the first reciprocating carrier 152 and the second reciprocating carrier 154 may be respectively operating in the second motion cycle (or reverse motion cycle) uniformly (or symmetrically). Accordingly, the first reciprocating carrier 152 and the second reciprocating carrier 154 may synchronously (or simultaneously) and uniformly (or symmetrically) move the first handle part 110 and the second handle part 120 in opposite directions relative to the elongate bridge 130 to retract the first handle part 110 and the second handle part 120 with respect to the elongate bridge 130 in a synchronous (or simultaneous) and uniform (or symmetrical) manner.

For example, when the extendable controller 100 is in the extended state (see FIG. 2B), the first reciprocating carrier 152 may be within the first half of the elongate bridge 130 and the first handle part 110 may be extended outwards from the first half of the elongate bridge 130, and the second reciprocating carrier 154 may be within the second half of the elongate bridge 130 and the second handle part 120 may extended outwards from the second half of the elongate bridge 130. During retraction of the extendable controller 100, the first reciprocating carrier 152 may move from the first half of the elongate bridge 130 to the second half of the elongate bridge 130 in a manner such that the first elongate member 170 may move the first handle part 110 longitudinally inwards towards the first half of the elongate bridge 130 along the extension axis 141 such that the first bridge-link-portion 114 of the first handle part 110 may overlap the first half of the elongate bridge 130. Similarly, during retraction of the extendable controller 100, the second reciprocating carrier 154 may move from the second half of the elongate bridge 130 to the first half of the elongate bridge 130 in a manner such that the second elongate member 180 may move the second handle part 120 longitudinally inwards towards the second half of the elongate bridge 130 along the extension axis 141 such that the second bridge-link-portion 124 of the second handle part 120 may overlap with the second half of the elongate bridge 130. Thus, a direction of movement of the first reciprocating carrier 152 from the first half of the elongate bridge 130 to the second half of the elongate bridge 130 may be opposite to a direction of movement of the second reciprocating carrier 154 from the second half of the elongate bridge 130 to the first half of the elongate bridge 130.

Referring to FIG. 2A and FIG. 2B, according to various embodiments, each of the first carrier-path 153 and the second carrier-path 155 may be straight. According to various other embodiments (not shown), each of the first carrier-path 153 and the second carrier-path 155 may be curved, wavy, zig-zag, or any other suitable path as long as the path is generally extending in the directions of the extension axis 141 of the extendable arrangement 140. Referring to FIG. 2A and FIG. 2B, according to various embodiments, each of the first carrier-path 153 and the second carrier-path 155 may be parallel to the extension axis 141. According to various embodiments, (not shown), each of the first carrier-path 153 and the second carrier-path 155 may be non-parallel to the extension axis 141 as long as the path is generally extending in the directions of the extension axis 141 of the extendable arrangement 140, for example, may be converging or diverging or skew with respect to the extension axis 141 of the extendable arrangement 140. According to various embodiments, each of the first carrier-path 153 and the second carrier-path 155 may have a profile and may be oriented such that the first reciprocating carrier 152 and the second reciprocating carrier 154 may be movable in opposite directions with respect to the extension axis 141 of the extendable arrangement 140 (i.e. corresponding to the two opposite directions along the extension axis 141).

Referring to FIG. 2A and FIG. 2B, according to various embodiments, the first carrier-path 153 and the second carrier-path 155 may be on opposite sides of the extension axis 141 of the extendable arrangement 140 (i.e. two opposites across the extension axis 141). According to various embodiments, the extension axis 141 of the extendable arrangement 140 may be along a centreline passing through the extendable arrangement 140 in the directions of extension and retraction. Accordingly, the first carrier-path 153 may be along a region of the extendable arrangement 140 on one side of the extension axis 141 (for example, above the extension axis 141) and the second carrier-path 155 may be along another region of the extendable arrangement 140 on another side of the extension axis 141 (for example, below the extension axis 141). Hence, the extension axis 141 of the extendable arrangement 140 may extend through the extendable arrangement 140 in a manner so as to set apart the first carrier-path 153 and the second carrier-path 155 on two opposite sides of the extension axis 141.

Referring to FIG. 2A and FIG. 2B, according to various embodiments, the first carrier-path 153 and the second carrier-path 155 may be equal in length and aligned to each other. According to various embodiments, with the first carrier-path 153 and the second carrier-path 155 equal in length, the first reciprocating carrier 152 and the second reciprocating carrier 154 may be moved to a same amount of displacement. According to various embodiments, the first carrier-path 153 and the second carrier-path 155 may be aligned such that a start point of the first carrier-path 153 and an end point of the second carrier-path 155 are opposite each other across the extension axis 141 and an end point of the first carrier-path 153 and a start point of the second carrier-path 155 are opposite each other across the extension axis 141.

Figure 3A:
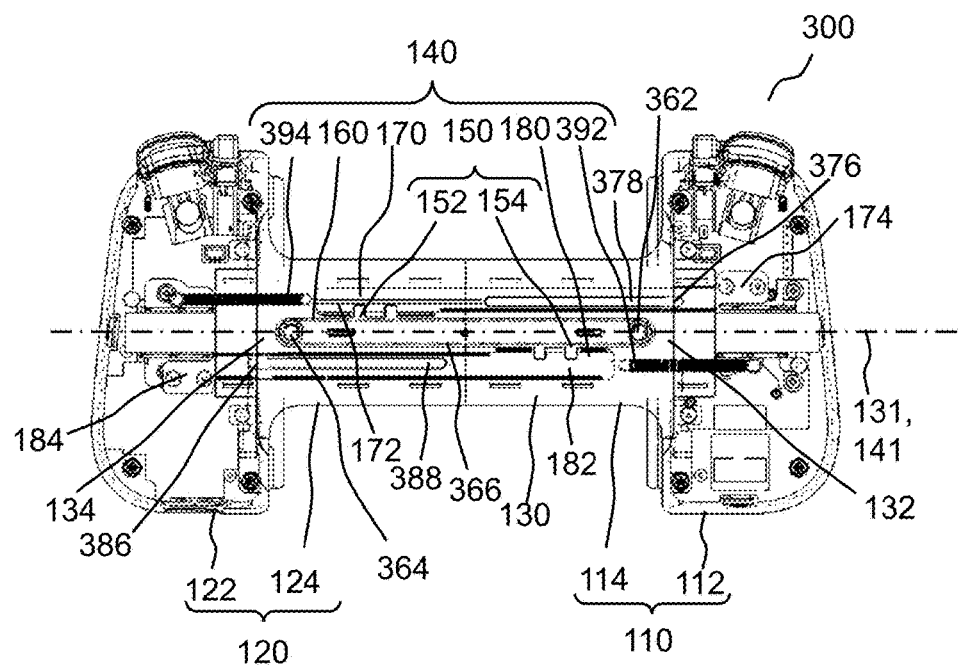
FIG. 3A shows a see-through view of an extendable controller in a retracted state according to various embodiments.
Figure 3B:
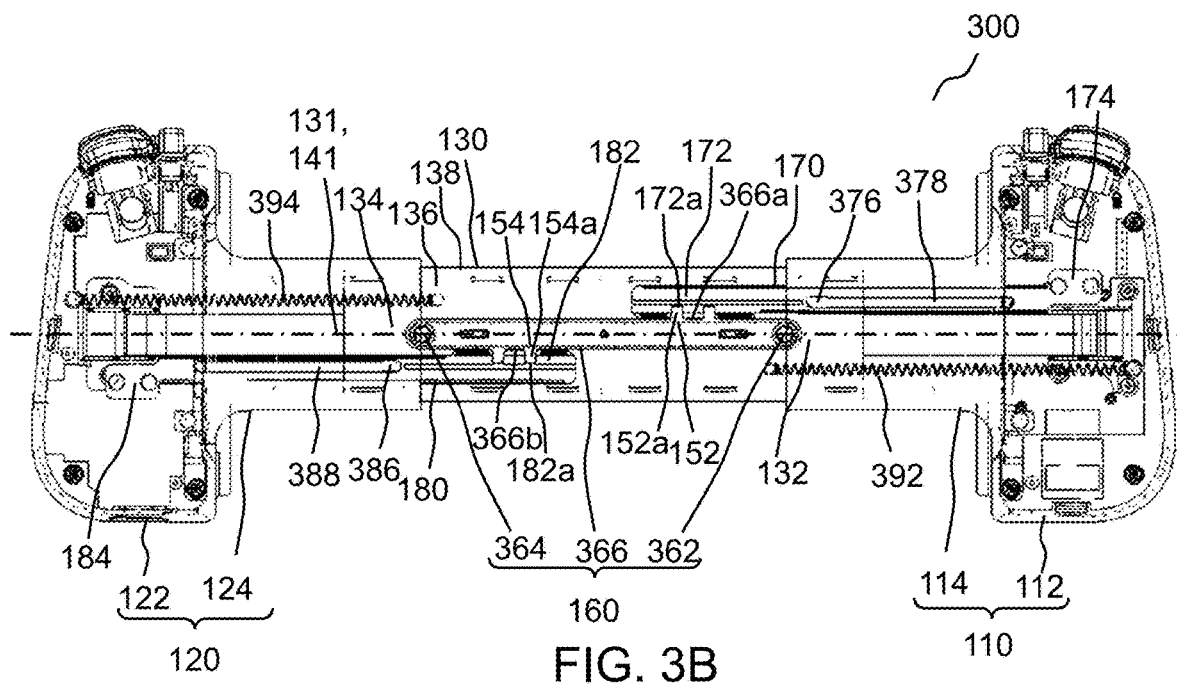
FIG. 3B shows a see-through view of the extendable controller of FIG. 3A in an extended state according to various embodiments.
Figure 4A:
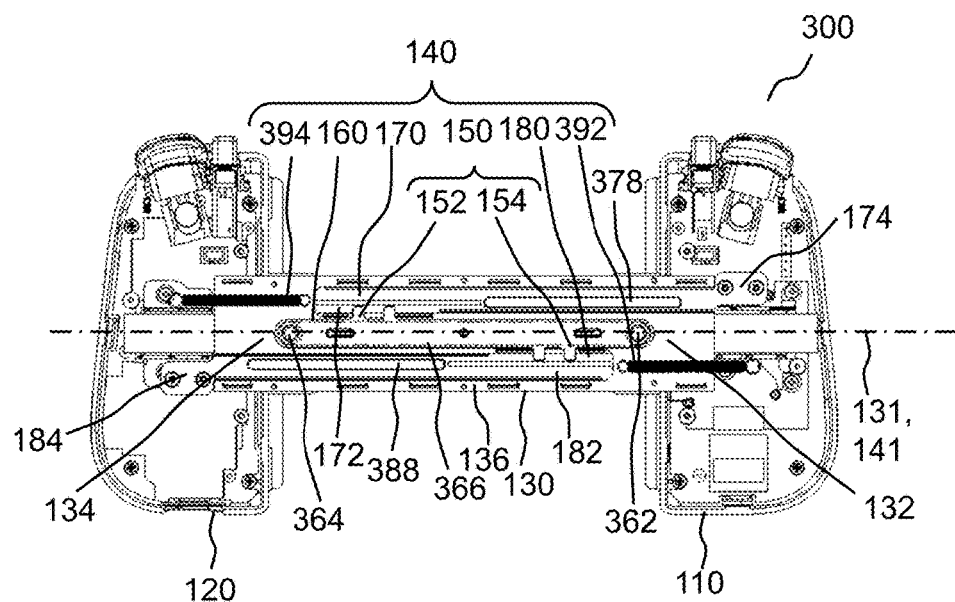
FIG. 4A shows the extendable controller of FIG. 3A, with a housing removed, in the retracted state according to various embodiments.
Figure 4B:
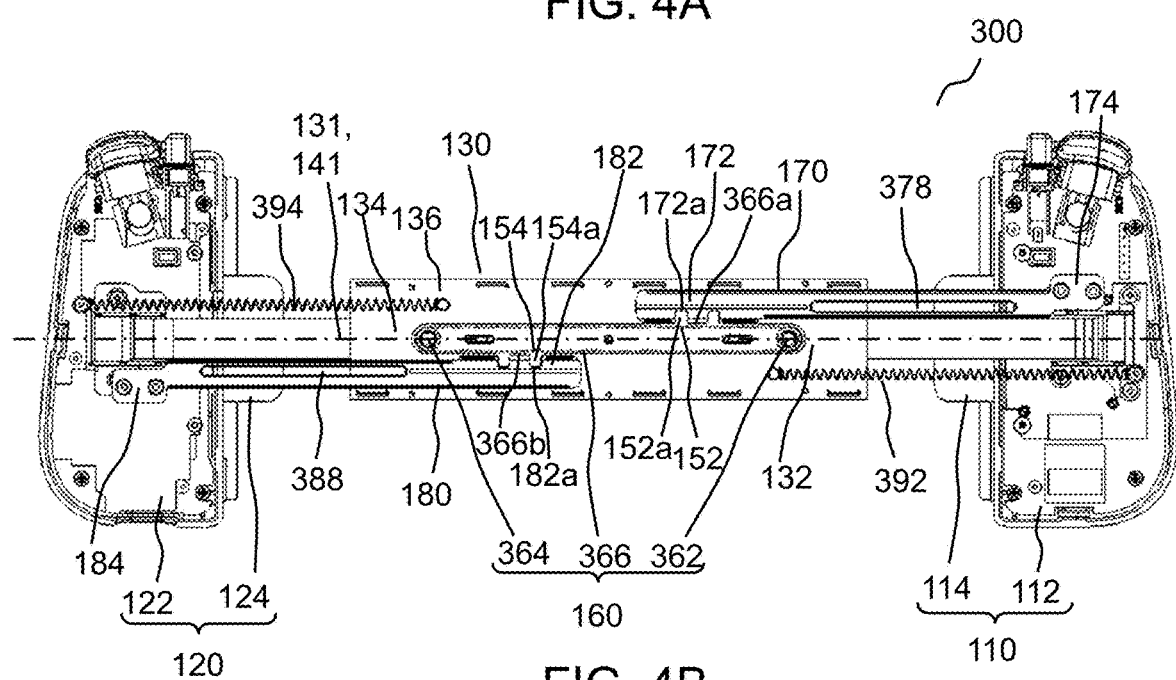
FIG. 4B shows the extendable controller of FIG. 3A, with the housing removed, in the extended state according to various embodiments.

FIG. 3A shows a see-through view of an extendable controller 300 in a retracted state according to various embodiments. FIG. 3B shows a see-through view of the extendable controller 300 in an extended state according to various embodiments. FIG. 4A shows the extendable controller 300, with a housing removed, in the retracted state according to various embodiments. FIG. 4B shows the extendable controller 300, with the housing removed, in the extended state according to various embodiments.

According to various embodiments, the extendable controller 300 of FIG. 3A to FIG. 4B includes all the features of the extendable controller 100 of FIG. 1A to FIG. 2B. Accordingly, all features, changes, modifications, and variations that are applicable to the extendable controller 100 of FIG. 1A to FIG. 2B may also be applicable to the extendable controller 300 of FIG. 3A to FIG. 4B. According to various embodiments, the extendable controller 300 of FIG. 3A to FIG. 4B may include the first handle part 110, the second handle part 120, the elongate bridge 130, and the extendable arrangement 140 (which includes the dual-reciprocating-opposite-motion-carrier system 150, the opposite motion mechanism 160, the first elongate member 170 and the second elongate member 180) as previously described in relation to the extendable controller 100 of FIG. 1A to FIG. 2B.

According to various embodiments, the opposite motion mechanism 160 of the extendable controller 300 of FIG. 3A to FIG. 4B may be a type of belt and pulleys mechanism. Referring to FIG. 3A to FIG. 4B, according to various embodiments, the opposite motion mechanism 160 of the extendable controller 300 may include a first pulley 362. According to various embodiments, the first pulley 362 may be rotatably coupled to a first end portion 132 of the elongate bridge 130 (or an outer portion of the first half of the elongate bridge 130 away from the mid-point 139 of the elongate bridge 130) in a manner so as to be rotatable about a first rotational axis perpendicular to the extension axis 141 of the extendable arrangement 140. According to various embodiments, the first rotational axis may extend through a center of the first pulley 362 such that the first pulley 362 may be rotatable about its own center. According to various embodiments, the opposite motion mechanism 160 of the extendable controller 300 may include a second pulley 364. According to various embodiments, the second pulley 364 may be rotatably coupled to a second end portion 134 of the elongate bridge 130 (or an outer portion of the second half of the elongate bridge 130 away from the mid-point 139 of the elongate bridge 130) in a manner so as to be rotatable about a second rotational axis perpendicular to the extension axis 141 of the extendable arrangement 140. According to various embodiments, the second rotational axis may extend through a center of the second pulley 364 such that the second pulley 364 may be rotatable about its own center. According to various embodiments, the second rotational axis of the second pulley 364 and the first rotational axis of the first pulley 362 may be parallel to each other.

According to various embodiments, the opposite motion mechanism 160 of the extendable controller 300 may include a continuous endless belt 366 looped over the first pulley 362 and the second pulley 364. Accordingly, the continuous endless belt 366, the first pulley 362, and the second pulley 364 may form a belt and pulleys mechanism serving as the opposite motion mechanism 160. According to various embodiments, the belt and pulleys mechanism formed by the continuous endless belt 366, the first pulley 362, and the second pulley 364 may be a conveyor-like mechanism. According to various embodiments, the continuous endless belt 366 may form a closed loop around the first pulley 362 and the second pulley 364 such that the continuous endless belt 366 may rotate about the first pulley 362 and the second pulley 364 for moving the continuous endless belt 366. According to various embodiments, the continuous endless belt 366 may rotate about the first pulley 362 and the second pulley 364 in a first direction (e.g. clockwise) and a second direction (e.g. anti-clockwise), whereby the second direction is opposite the first direction.

According to various embodiments, the first reciprocating carrier 152 may be at a first segment 366a of the continuous endless belt 366 and the second reciprocating carrier 154 may be at a second segment 366b of the continuous endless belt 366. The first segment 366a of the continuous endless belt 366 and the second segment 366b of the continuous endless belt 366 may be on opposite sides of the opposite motion mechanism 160 across the extension axis 141. Accordingly, the first segment 366a of the continuous endless belt 366 and the second segment 366b of the continuous endless belt 366 may be on opposite sides of the extension axis 141 such that the first reciprocating carrier 152 and the second reciprocating carrier 154 may be on corresponding sides of the extension axis 141. Hence, the first segment 366a of the continuous endless belt 366 together with the first reciprocating carrier 152 may be along a region of the extendable arrangement 140 on one side of the extension axis 141 (for example, above the extension axis 141) and the second segment 366b of the continuous endless belt 366 together with the second reciprocating carrier 154 may be along another region of the extendable arrangement 140 on another side of the extension axis 141 (for example, below the extension axis 141).

According to various embodiments, with the first reciprocating carrier 152 at the first segment 366a of the continuous endless belt 366 on one side of the extension axis 141 and the second reciprocating carrier 154 at the second segment 366b of the continuous endless belt 366 on an opposite side of the extension axis 141, rotating the continuous endless belt 366 about the first pulley 362 and the second pulley 364 may move the first reciprocating carrier 152 and the second reciprocating carrier 154 opposite to each other with respect to the extension axis 141 (i.e. corresponding to the two opposite directions along the extension axis 141). Accordingly, rotating the continuous endless belt 366 about the first pulley 362 and the second pulley 364 may move the first reciprocating carrier 152 in a first direction (e.g. left to right) with respect to the extension axis 141 and may move the second reciprocating carrier 154 in a second direction (e.g. right to left) with respect to the extension axis 141. The first direction and the second direction may be opposite directions with respect to each other. For example, according to various embodiments, the first direction and the second direction may be respectively parallel to opposite directions along the extension axis 141.

According to various embodiments, when the extendable controller 300 is in the retracted state, the first reciprocating carrier 152 at the first segment 366a of the continuous endless belt 366 may be proximal to the second pulley 364 (or the second end portion 134 of the elongate bridge 130) and the first bridge-link-portion 114 of the first handle part 110 may overlap with the first half of the elongate bridge 130 (or the first end portion 132 of the elongate bridge 130), and the second reciprocating carrier 154 at the second segment 366b of the continuous endless belt 366 may be proximal to the first pulley 362 (or the first end portion 132 of the elongate bridge 130) and the second bridge-link-portion 124 of the second handle part 120 may overlap with the second half of the elongate bridge 130 (or the second end portion 134 of the elongate bridge 130). Accordingly, during extension of the extendable controller 300, rotating the continuous endless belt 366 about the first pulley 362 and the second pulley 364 in the first direction (e.g. clockwise) may move the first reciprocating carrier 152 from the second pulley 364 (or the second end portion 134 of the elongate bridge 130) towards the first pulley 362 (or the first end portion 132 of the elongate bridge 130) in a manner such that the first elongate member 170 may move the first handle part 110 longitudinally outwards from the first half of the elongate bridge 130 (or first end portion 132 of the elongate bridge 130) along the extension axis 141. Similarly, during extension of the extendable controller 300, rotating the continuous endless belt 366 about the first pulley 362 and the second pulley 364 in the first direction (e.g. clockwise) may synchronously (or simultaneously) move the second reciprocating carrier 154 from the first pulley 362 (or the first end portion 132 of the elongate bridge 130) towards the second pulley 364 (or the second end portion 134 of the elongate bridge 130) in a manner such that the second elongate member 180 may move the second handle part 120 longitudinally outwards from the second half of the elongate bridge 130 (or the second end portion 134 of the elongate bridge 130) along the extension axis 141. Thus, a direction of movement of the first reciprocating carrier 152 from the second pulley 364 (or the second end portion 134 of the elongate bridge 130) towards the first pulley 362 (or the first end portion 132 of the elongate bridge 130) may be opposite to a direction of movement of the second reciprocating carrier 154 from the first pulley 362 (or the first end portion 132 of the elongate bridge 130) towards the second pulley 364 (or the second end portion 134 of the elongate bridge 130).

According to various embodiments, when the extendable controller 300 is in the extended state, the first reciprocating carrier 152 at the first segment 366a of the continuous endless belt 366 may be proximal to the first pulley 362 (or the first end portion 132 of the elongate bridge 130) and the first handle part 110 may be extended outwards from the first half of the elongate bridge 130 (or the first end portion 132 of the elongate bridge 130), and the second reciprocating carrier 154 at the second segment 366b of the continuous endless belt 366 may be proximal to the second pulley 364 (or the second end portion 134 of the elongate bridge 130) and the second handle part 120 may be extended outwards from the second half of the elongate bridge 130 (or the second end portion 134 of the elongate bridge 130). Accordingly, during retraction of the extendable controller 300, rotating the continuous endless belt 366 about the first pulley 362 and the second pulley 364 in the second direction (e.g. anti-clockwise) may move the first reciprocating carrier 152 from the first pulley 362 (or the first end portion 132 of the elongate bridge 130) towards the second pulley 364 (or the second end portion 134 of the elongate bridge 130) in a manner such that the first elongate member 170 may move the first handle part 110 longitudinally inwards to overlap with the first half of the elongate bridge 130 (or first end portion 132 of the elongate bridge 130) along the extension axis 141. Similarly, during retraction of the extendable controller 300, rotating the continuous endless belt 366 about the first pulley 362 and the second pulley 364 in the second direction (e.g. anti-clockwise) may synchronously (or simultaneously) move the second reciprocating carrier 154 from the second pulley 364 (or the second end portion 134 of the elongate bridge 130) towards the first pulley 362 (or the first end portion 132 of the elongate bridge 130) in a manner such that the second elongate member 180 may move the second handle part 120 longitudinally inwards to overlap with the second half of the elongate bridge 130 (or the second end portion 134 of the elongate bridge 130) along the extension axis 141. Thus, a direction of movement of the first reciprocating carrier 152 from the first pulley 362 (or the first end portion 132 of the elongate bridge 130) towards the second pulley 364 (or the second end portion 134 of the elongate bridge 130) may be opposite to a direction of movement of the second reciprocating carrier 154 from the second pulley 364 (or the second end portion 134 of the elongate bridge 130) towards the first pulley 362 (or the first end portion 132 of the elongate bridge 130).

According to various embodiments, since the first reciprocating carrier 152 and the second reciprocating carrier 154 are on the same continuous endless belt 366, rotating the continuous endless belt 366 about the first pulley 362 and the second pulley 364 may move the first reciprocating carrier 152 and the second reciprocating carrier 154 synchronously (or simultaneously) and uniformly (or symmetrically).

According to various embodiments, the continuous endless belt 366 may include a toothed belt, a flat belt, a round belt, a V belt, a multi-groove belt, a ribbed belt or a chain. According to various embodiments, the continuous endless belt 366 may be made of any suitable material, including but not limited to, thermoplastic polyurethane (TPU), polyurethane (PU), or styrene-ethylene-butylene-styrene (SEBS). According to various embodiments, each of the first pulley 362 and the second pulley 364 may include a corresponding toothed pulley, a flat-belt pulley, a grooved pulley, a V-grooved pulley, or a multi-grooved pulley.

According to various embodiments, the first reciprocating carrier 152 may be an integral part of the continuous endless belt 366 at the first segment 366a of the continuous endless belt 366. Similarly, according to various embodiments, the second reciprocating carrier 154 may be an integral part of the continuous endless belt 366 at the second segment 366b of the continuous endless belt 366. According to various embodiments, the first reciprocating carrier 152, the second reciprocating carrier 154 and the continuous endless belt 366 may be integrally formed or molded as a one-piece article. According to various embodiments, the first reciprocating carrier 152, the second reciprocating carrier 154 and the continuous endless belt 366 may be made of the same material. According to various embodiments, the first reciprocating carrier 152, the second reciprocating carrier 154 and the continuous endless belt 366 may be integrally joined or connected together to form a single integrated unit. According to various embodiments, the first reciprocating carrier 152, the second reciprocating carrier 154 and the continuous endless belt 366 may be made of the same or different material.

According to various embodiments, the first reciprocating carrier 152 may be coupled (or directly coupled) to the second end portion 172 of the first elongate member 170 via various suitable coupling means, including but not limited to, fastening means, interlocking means, or adhesive means. Similarly, according to various embodiments, the second reciprocating carrier 154 may be coupled (or directly coupled) to the second end portion 182 of the second elongate member 180 via various suitable coupling means, including but not limited to, fastening means, interlocking means, or adhesive means.

For example, referring to FIG. 3A to FIG. 4B, according to various embodiments, the first reciprocating carrier 152 may include an interlocking arrangement 152a and the second end portion 172 of the first elongate member 170 may include a complementary interlocking arrangement 172a. According to various embodiments, the interlocking arrangement 152a of the first reciprocating carrier 152 and the complementary interlocking arrangement 172a of the first elongate member 170 may be interlocked with each other so as to couple (or directly couple) the second end portion 172 of the first elongate member 170 to the first reciprocating carrier 152. Similarly, according to various embodiments, the second reciprocating carrier 154 may include an interlocking arrangement 154a and the second end portion 182 of the second elongate member 180 may include a complementary interlocking arrangement 182a. According to various embodiments, the interlocking arrangement 154a of the second reciprocating carrier 154 and the complementary interlocking arrangement 182a of the second elongate member 180 may be interlocked with each other so as to couple (or directly couple) the second end portion 182 of the second elongate member 180 to the second reciprocating carrier 154.

According to various embodiments, the interlocking arrangement 152a of the first reciprocating carrier 152 may be an integral part of the first reciprocating carrier 152. Similarly, the interlocking arrangement 154a of the second reciprocating carrier 154 may be an integral part of the second reciprocating carrier 152. According to various embodiments, the interlocking arrangement 152a of the first reciprocating carrier 152 may be integrally formed, molded, joined, or connected to the first reciprocating carrier 152. Similarly, according to various embodiments, the interlocking arrangement 154a of the second reciprocating carrier 154 may be integrally formed, molded, joined, or connected to the second reciprocating carrier 154. According to various embodiments, the first reciprocating carrier 152 may be configured such that the entire first reciprocating carrier 152 may be the interlocking arrangement 152a of the first reciprocating carrier 152. Similarly, according to various embodiments, the second reciprocating carrier 154 may be configured such that the entire second reciprocating carrier 154 may be the interlocking arrangement 154a of the second reciprocating carrier 154.

According to various embodiments, the complementary interlocking arrangement 172a of the second end portion 172 of the first elongate member 170 may be an integral part of the first elongate member 170. Similarly, according to various embodiments, the complementary interlocking arrangement 182a of the second end portion 182 of the second elongate member 180 may be an integral part of the second elongate member 180. According to various embodiments, the complementary interlocking arrangement 172a of the second end portion 172 of the first elongate member 170 may be integrally formed, molded, joined or connected to the first elongate member 170. Similarly, according to various embodiments, the complementary interlocking arrangement 182a of the second end portion 182 of the second elongate member 180 may be integrally formed, molded, joined or connected to the second elongate member 180.

According to various embodiments, the interlocking arrangement 152a of the first reciprocating carrier 152 and the complementary interlocking arrangement 172a of the second end portion 172 of the first elongate member 170 may be configured so as to be interlockable in a manner such that the first reciprocating carrier 152 and the second end portion 172 of the first elongate member 170 may be immovable relative to each other. Hence, the interlocking arrangement 152a of the first reciprocating carrier 152 and the complementary interlocking arrangement 172a of the second end portion 172 of the first elongate member 170 may be fitted together to ensure coordinated movement of the first reciprocating carrier 152 and the first elongate member 170 as a whole. Similarly, the interlocking arrangement 154a of the second reciprocating carrier 154 and the complementary interlocking arrangement 182a of the second end portion 182 of the second elongate member 180 may be configured so as to be interlockable in a manner such that the second reciprocating carrier 154 and the second end portion 182 of the second elongate member 180 may be immovable relative to each other. Hence, the interlocking arrangement 154a of the second reciprocating carrier 154 and the complementary interlocking arrangement 182a of the second end portion 182 of the second elongate member 180 may be fitted together to ensure coordinated movement of the second reciprocating carrier 154 and the second elongate member 180 as a whole.

For example, according to various embodiments, the interlocking arrangement 152a of the first reciprocating carrier 152 may be a protrusion and the complementary interlocking arrangement 172a of the first elongate member 170 may be a notch, or vice versa. Accordingly, the interlocking arrangement 152a of the first reciprocating carrier 152 and the complementary interlocking arrangement 172a of the first elongate member 170 may form a tongue and groove joint, or a mortise and tenon joint. Similarly, according to various embodiments, the interlocking arrangement 154a of the second reciprocating carrier 154 may be a protrusion and the complementary interlocking arrangement 182a of second elongate member 180 may be a notch, or vice versa. Accordingly, the interlocking arrangement 154a of the second reciprocating carrier 154 and the complementary interlocking arrangement 182a of second elongate member 180 may form a tongue and groove joint, or a mortise and tenon joint.

According to various embodiments, the extendable arrangement 140 of the extendable controller 300 may further include a first biasing element 392 and a second biasing element 294.

According to various embodiments, the first biasing element 392 may be connected between the first handle part 110 and the first end portion 132 of the elongate bridge 130. According to various embodiments, the first biasing element 392 may be configured to bias against extending the first handle part 110 from the elongate bridge 130 along the extension axis 141. Accordingly, the first biasing element 392 may apply a biasing force to act against (or to resist) a force pulling the first handle part 110 away from the first end portion 132 of the elongate bridge 130 when the first handle part 110 is being extended from the elongate bridge 130. Hence, the biasing force may built up in the first biasing element 392 as the first handle part 110 is being extended from the first end portion 132 of the elongate bridge 130. According to various embodiments, when the force pulling the first handle part 110 away from the first end portion 132 of the elongate bridge 130 is released, the biasing force built up in the first biasing element 392 may then retract the first handle part 110 relative to the elongate bridge 130 so as to return the first handle part 110 to the retracted state. Accordingly, the first biasing element 392 may provide the tendency or the urge for the first handle part 110 to return to the retracted state when the first handle part 110 is undergoing extension or is extended.

Similarly, according to various embodiments, the second biasing element 394 may be connected between the second handle part 120 and the second end portion 134 of the elongate bridge 130. According to various embodiments, the second biasing element 394 may be configured to bias against extending the second handle part 120 from the elongate bridge 130 along the extension axis 141. Accordingly, the second biasing element 394 may apply a biasing force to act against (or to resist) a force pulling the second handle part 120 away from the second end portion 134 of the elongate bridge 130 when the second handle part 120 is being extended from the elongate bridge 130. Hence, the biasing force may built up in the second biasing element 394 as the second handle part 120 is being extended from the second end portion 134 of the elongate bridge 130. According to various embodiments, when the force pulling the second handle part 120 away from the second end portion 134 of the elongate bridge 130 is released, the biasing force built up in the second biasing element 394 may then retract the second handle part 120 relative to the elongate bridge 130 so as to return the second handle part 120 to the retracted state. Accordingly, the second biasing element 394 may provide the tendency or the urge for the second handle part 120 to return to the retracted state when the second handle part 120 is undergoing extension or is extended.

According to various embodiments, each of the first biasing element 392 and the second biasing element 394 may include, but not limited to, a tension spring or an extension spring. According to various embodiments, for example when the first biasing element 392 is a tension spring or an extension spring, a first end of the first biasing element 392 may be coupled to the the first handle part 110 and a second end of the first biasing element 392 may be coupled to the first end portion 132 of the elongate bridge 130. Similarly, According to various embodiments, for example when the second biasing element 394 is a tension spring or an extension spring, a first end of the second biasing element 394 may be coupled to the the second handle part 120 and a second end of the second biasing element 394 may be coupled to the second end portion 134 of the elongate bridge 130.

According to various embodiments, the first biasing element 392 and the first reciprocating carrier 152 may be on opposite sides of the opposite motion mechanism 160 with respect to the extension axis 141 (i.e. the two opposite sides across the extension axis 141). Accordingly, the first biasing element 392 and the first reciprocating carrier 152 may be arranged such that the first biasing element 392 may be coupled to the first end portion 132 of the elongate bridge 130 on a side of the opposite motion mechanism 160 opposite and away from the first reciprocating carrier 152 with respect to the extension axis 141 (i.e. across the extension axis 141). For example, the first biasing element 392 may be coupled to the first end portion 132 of the elongate bridge 130 on the side of the opposite motion mechanism 160 below the extension axis 141 when the first reciprocating carrier 152 is on the side of the opposite motion mechanism 160 above the extension axis 141.

Similarly, according to various embodiments, the second biasing element 394 and the second reciprocating carrier 154 may be on opposite sides of the opposite motion mechanism 160 with respect to the extension axis 141 (i.e. the two opposite sides across the extension axis 141). Accordingly, the second biasing element 394 and the second reciprocating carrier 154 may be arranged such that the second biasing element 394 may be coupled to the second end portion 134 of the elongate bridge 130 on a side of the opposite motion mechanism 160 opposite and away from the second reciprocating carrier 154 with respect to the extension axis 141 (i.e. across the extension axis). For example, the second biasing element 394 may be coupled to the second end portion 134 of the elongate bridge 130 on the side of the opposite motion mechanism 160 above the extension axis 141 when the second reciprocating carrier 154 is on the side of the opposite motion mechanism 160 below the extension axis 141.

According to various embodiments, the first elongate member 170 may be parallel to the extension axis 141, and the second elongate member 180 may be parallel to the extension axis 141. Accordingly, the first elongate member 170 and the second elongate member 180 may be parallel to each other. Hence, the first elongate member 170 and the second elongate member 180 may be movable opposite to each other (i.e. corresponding to the two opposites direction along the extension axis 141) in a parallel manner. According to various embodiments, since the first reciprocating carrier 152 and the second reciprocating carrier 154 are on opposite sides of the opposite motion mechanism 160 and the first elongate member 170 and the second elongate member 180 are respectively coupled to the first reciprocating carrier 152 and the second reciprocating carrier 154, the first elongate member 170 and the second elongate member 180 may correspondingly be on two opposites sides of the opposite motion mechanism 160 with respect to the extension axis 141 (i.e. the two opposite sides across the extension axis 141).

According to various embodiments, the extendable controller 300 may include a first guide pin 376 and a second guide pin 386. According to various embodiments, the first guide pin 376 may be disposed at the first end portion 132 of the elongate bridge 130. According to various embodiments, the first guide pin 376 may be fixed with respect to the elongate bridge 130. For example, the first guide pin 376 may be fixed to the elongate bridge 130, or a body of the elongate bridge 130, or a housing of the elongate bridge 130. According to various embodiments, the first guide pin 376 may be perpendicular to the first elongate member 170. According to various embodiments, the second guide pin 286 may be disposed at the second end portion 134 of the elongate bridge 130. According to various embodiments, the second guide pin 386 may be fixed with respect to the elongate bridge 130. For example, the second guide pin 386 may be fixed to the elongate bridge 130, or a body of the elongate bridge 130, or a housing of the elongate bridge 130. According to various embodiments, the second guide pin 286 may be perpendicular to the second elongate member 180.

According to various embodiments, the first elongate member 170 may include an elongate slot 378 extending longitudinally along a length of the first elongate member 170. According to various embodiments, the first guide pin 376 may be fitted through the elongate slot 378 of the first elongate member 170 to guide a longitudinal movement of the first elongate member 170. Accordingly, the first guide pin 376 may be fitted through the elongate slot 378 of the first elongate member 170 in a transverse manner such that moving the first elongate member 170 longitudinally may slide the first elongate member 170 relative to the first guide pin 376. According to various embodiments, the elongate slot 378 of the first elongate member 170 may also serve as a stopper or limiter which may limit a range of longitudinal movement of the first elongate member 170 as a measure to limit the amount of extension of the first handle part 110 from the elongate bridge 130.

According to various embodiments, the second elongate member 180 may include an elongate slot 388 extending longitudinally along a length of the second elongate member 180. According to various embodiments, the second guide pin 386 may be fitted through the elongate slot 388 of the second elongate member 180 to guide a longitudinal movement of the second elongate member 180. Accordingly, the second guide pin 386 may be fitted through the elongate slot 388 of the second elongate member 180 in a transverse manner such that moving the second elongate member 180 longitudinally may slide the second elongate member 180 relative to the second guide pin 386. According to various embodiments, the elongate slot 388 of the second elongate member 180 may also serve as a stopper or limiter which may limit a range of longitudinal movement of the second elongate member 180 as a measure to limit the amount of extension of the second handle part 120 from the elongate bridge 130.

According to various embodiments, the first bridge-link-portion 114 of the first handle part 110 may be of a sleeve-like structure fitted over the first half of the elongate bridge 130. According to various embodiments, the sleeve-like structure of the the first bridge-link-portion 114 may be hollow such that the first half of the elongate bridge 130 may be inserted therein. According to various embodiments, the sleeve-like structure of the the first bridge-link-portion 114 fitted over the first half of the elongate bridge 130 may form the sliding engagement between the first bridge-link-portion 114 of the first handle part 110 and the first half of the elongate bridge 130.

Similarly, according to various embodiments, the second bridge-link-portion 124 of the second handle part 120 may be of a sleeve-like structure fitted over the second half of the elongate bridge 130. According to various embodiments, the sleeve-like structure of the the second bridge-link-portion 124 may be hollow such that the second half of the elongate bridge 130 may be inserted therein. According to various embodiments, the sleeve-like structure of the the second bridge-link-portion 124 fitted over the second half of the elongate bridge 130 may form the sliding engagement between the second bridge-link-portion 124 of the second handle part 120 and the second half of the elongate bridge 130.

According to various embodiments, the first bridge-link-portion 114 of the first handle part 110 and the second bridge-link-portion 124 of the second handle part 120 may be configured such that the first bridge-link-portion 114 of the first handle part 110 and the second bridge-link-portion 124 of the second handle part 120 may fully enclose or conceal the elongate bridge 130 when the extendable controller 300 is in the retracted state.

Figure 5A:
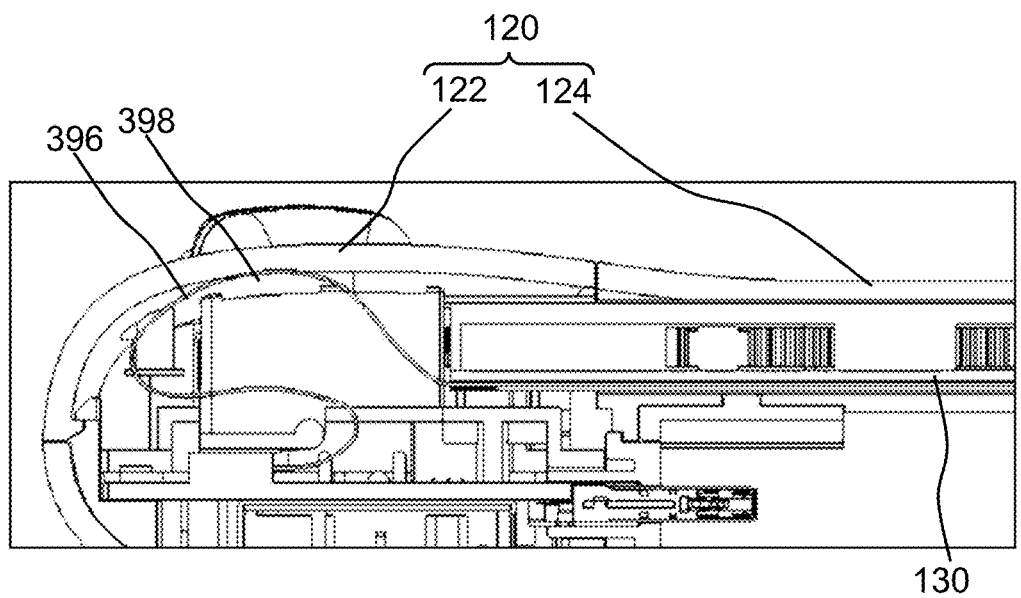
FIG. 5A shows a cross-sectional view of a second handle part of the extendable controller of FIG. 3A in the retracted state according to various embodiments.
Figure 5B:
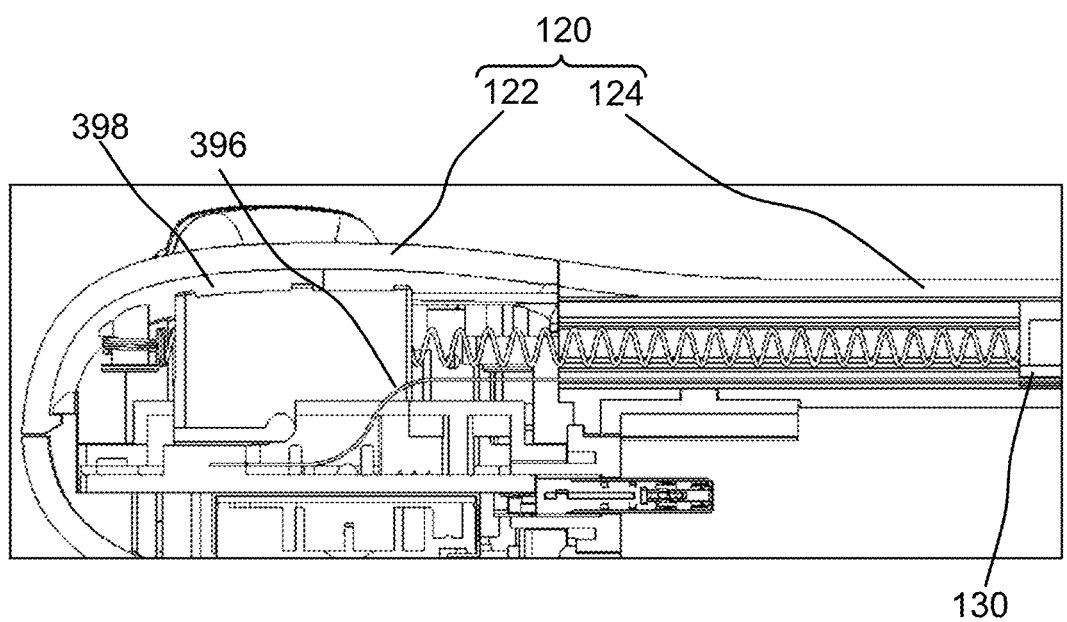
FIG. 5B shows a cross-sectional view of the second handle part of the extendable controller of FIG. 3A in the extended state according to various embodiments.

FIG. 5A shows a cross-sectional view of the second handle part 120 of the extendable controller 300 in the retracted state according to various embodiments. FIG. 5B shows a cross-sectional view of the second handle part 120 of the extendable controller 300 in the extended state according to various embodiments. According to various embodiments, the extendable controller 300 may include an electrical cable 396 extending between the first handle part 110 and the second handle part 120. According to various embodiments, the electrical cable 396 may serve to establish electrical communication between the first handle part 110 and the second handle part 120. Accordingly, control input signal received in the first handle part 110 may be shared with the second handle part 120, and vice versa. Hence, the first handle part 110 and the second handle part 120 may be operated as a single controller.

According to various embodiments, the electrical cable 396 may extend from the first handle part 110, along the first bridge-link-portion 114 of the first handle part 110, along the elongate bridge 130, and along the second bridge-link-portion 124 of the second handle part 120 to the second handle part 120. Accordingly, the electrical cable 396 may be extending alongside the extendable arrangement 140 of the extendable controller 300.

According to various embodiments, when the extendable controller 300 is fully extended, the electrical cable 396 may be fully stretched to extend between the first handle part 110 and the second handle part 120. According to various embodiments, when the extendable controller 300 is retracted, a cable management arrangement may stow the excess length of the electrical cable 396. According to various embodiments, each of the first handle-body-portion 112 of the first handle part 110 and the second handle-body-portion 122 of the second handle part 120 may include an empty inner cavity 398 for accommodating the excess length of the electrical cable 396, whereby the excess length of electrical cable 396 may curl or bend into the empty inner cavity 398 when the extendable controller 300 is retracted. Accordingly, the empty inner cavity 398 may serve as the cable management arrangement for managing the excess length of the electrical cable 396 when the extendable controller 300 is retracted.

According to various embodiments, the electrical cable 396 may include, but not limited to, a flexible flat cable, a flexible cable, a ribbon cable, a coaxial cable, or a wire.

According to various embodiments, the elongate bridge 130 may include an elongate body 136 and a hollow casing 138 coupled to the elongate body 136. The hollow casing 138 may define a through channel extending from end to end. According to various embodiments, the dual-reciprocating-opposite-motion-carrier system 150 (including the first reciprocating carrier 152, the second reciprocating carrier 154, and the opposite motion mechanism 160) may be located or disposed within the through channel of hollow casing 138 of the elongate bridge 130. For example, the dual-reciprocating-opposite-motion-carrier system 150 may be disposed on the elongate body 136 of the elongate bridge 130. According to various embodiments, the first pulley 362, the second pulley 364 and the continuous endless belt 366 may be correspondingly located or disposed within the through channel of the hollow casing 138 of the elongate bridge 130 (or disposed on the elongate body 136 of the elongate bridge 130), when the opposite motion mechanism 160 includes the first pulley 362, the second pulley 364 and the continuous endless belt 366.

Various embodiments have provided an extendable controller capable of synchronously (or simultaneously) extending or retracting the first handle part and the second handle part uniformly (or symmetrically) in opposite directions relative to the elongate bridge. Various embodiments have also provided an extendable controller which is reliable and durable, and which is capable of providing stable and balance extension and retraction of the extendable controller.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:
1. An extendable controller comprising:
a first handle part having a first bridge-link-portion extending from a first handle-body-portion;
a second handle part having a second bridge-link-portion extending from a second handle-body-portion;
an elongate bridge with a first half of the elongate bridge in sliding engagement with the first bridge-link-portion of the first handle part along a longitudinal axis of the elongate bridge and a second half of the elongate bridge in sliding engagement with the second bridge-link-portion of the second handle part along the longitudinal axis of the elongate bridge; and
an extendable arrangement interconnecting the elongate bridge, the first handle part and the second handle part in a manner so as to synchronously extend and retract the first handle part and the second handle part uniformly in opposite directions relative to the elongate bridge along an extension axis, the extension axis being parallel to or coincide with the longitudinal axis of the elongate bridge,
wherein the extendable arrangement comprises:
a dual-reciprocating-opposite-motion-carrier system within the elongate bridge, the dual-reciprocating-opposite-motion-carrier system comprising:
a first reciprocating carrier movable relative to the elongate bridge along a first carrier-path and within the elongate bridge,
a second reciprocating carrier movable relative to the elongate bridge along a second carrier-path and within the elongate bridge, and an opposite motion mechanism interconnecting the first reciprocating carrier and the second reciprocating carrier, the opposite motion mechanism being configured to move the first reciprocating carrier and the second reciprocating carrier in opposite directions with respect to the extension axis of the extendable arrangement, wherein the opposite motion mechanism comprises a first pulley rotatably coupled to a first end portion of the elongate bridge in a manner so as to be rotatable about a first rotational axis perpendicular to the extension axis, a second pulley rotatably coupled to a second end portion of the elongate bridge in a manner so as to be rotatable about a second rotational axis perpendicular to the extension axis, the second rotational axis being parallel to the first rotational axis, and a continuous endless belt looped over the first pulley and the second pulley, wherein the first reciprocating carrier is at a first segment of the continuous endless belt and the second reciprocating carrier is at a second segment of the continuous endless belt, the first segment of the continuous endless belt and the second segment of the continuous endless belt being on opposite sides of the opposite motion mechanism across the extension axis;

a first elongate member with a first end portion coupled to the first handle part and a second end portion coupled to the first reciprocating carrier of the dual-reciprocating-opposite-motion-carrier system, and a second elongate member with a first end portion coupled to the second handle part and a second end portion coupled to the second reciprocating carrier of the dual-reciprocating-opposite-motion-carrier system.

2. The extendable controller as claimed in claim 1, wherein the first carrier-path and the second carrier-path are parallel to the extension axis and on opposite sides of the extension axis.

3. The extendable controller as claimed in claim 2, wherein the first carrier-path and the second carrier-path are equal in length and aligned to each other.

4. The extendable controller as claimed in claim 1, wherein the first elongate member is parallel to the extension axis, and the second elongate member is parallel to the extension axis.

5. The extendable controller as claimed in claim 4, further comprising:

a first guide pin disposed at the first end portion of the elongate bridge, a second guide pin disposed at the second end portion of the elongate bridge, and wherein the first elongate member comprises an elongate slot extending longitudinally along a length of the first elongate member, and the first guide pin is fitted through the elongate slot of the first elongate member to guide a longitudinal movement of the first elongate member, wherein the second elongate member comprises an elongate slot extending longitudinally along a length of the second elongate member, and the second guide pin is fitted through the elongate slot of the second elongate member to guide a longitudinal movement of the second elongate member.

6. The extendable controller as claimed in claim 1, wherein the continuous endless belt is a toothed belt, and wherein each of the first pulley and the second pulley is a toothed pulley.

7. The extendable controller as claimed in claim 1 wherein the continuous endless belt is made of thermoplastic polyurethane (TPU), polyurethane (PU), or styrene-ethylene-butylene-styrene (SEBS).

8. The extendable controller as claimed in claim 1, wherein the first reciprocating carrier comprises an interlocking arrangement and the second end portion of the first elongate member comprises a complementary interlocking arrangement, wherein the interlocking arrangement of the first reciprocating carrier and the complementary interlocking arrangement of the first elongate member are interlocked with each other so as to couple the second end portion of the first elongate member to the first reciprocating carrier, wherein the second reciprocating carrier comprises an interlocking arrangement and the second end portion of the second elongate member comprises a complementary interlocking arrangement, wherein the interlocking arrangement of the second reciprocating carrier and the complementary interlocking arrangement of the second elongate member are interlocked with each other so as to couple the second end portion of the second elongate member to a second segment of a continuous endless belt, and wherein the interlocking arrangement of the first reciprocating carrier is a protrusion and the complementary interlocking arrangement of the first elongate member is a notch, wherein the interlocking arrangement of the second reciprocating carrier is a protrusion and the complementary interlocking arrangement of the second elongate member is a notch.

9. The extendable controller as claimed in claim 1, wherein the extendable arrangement further comprises;

a first biasing element connected between the first handle part and the first end portion of the elongate bridge, the first biasing element being configured to bias against extending the first handle part from the elongate bridge along the extension axis, a second biasing element connected between the second handle part and the second end portion of the elongate bridge, the second biasing element being configured to bias against extending the second handle part from the elongate bridge along the extension axis, wherein each of the first biasing element and the second biasing element is a tension spring or extension spring, or wherein the second biasing element and the second reciprocating carrier are on opposite sides of the opposite motion mechanism with respect to the extension axis.

10. The extendable controller as claimed in claim 1, wherein the first bridge-link-portion is of a sleeve-like structure fitted over the first half of the elongate bridge, wherein the second bridge-link-portion is of a sleeve-like structure fitted over the second half of the elongate bridge.

11. The extendable controller as claimed in claim 1, further comprising an electrical cable extending between the first handle part and the second handle part, wherein the electrical cable extends along the first bridge-link-portion, the elongate bridge and the second bridge-link-portion, or wherein the electrical cable comprises a flexible flat cable, a flexible cable, a ribbon cable, a coaxial cable, or a wire.

12. An extendable controller comprising:
a first handle part having a first bridge-link-portion extending from a first handle-body-portion;
a second handle part having a second bridge-link-portion extending from a second handle-body-portion;
an elongate bridge with a first half of the elongate bridge in sliding engagement with the first bridge-link-portion of the first handle part along a longitudinal axis of the elongate bridge and a second half of the elongate bridge in sliding engagement with the second bridge-link-portion of the second handle part along the longitudinal axis of the elongate bridge; and
an extendable arrangement interconnecting the elongate bridge, the first handle part and the second handle part in a manner so as to synchronously extend and retract the first handle part and the second handle part uniformly in opposite directions with respect to the elongate bridge along an extension axis, the extension axis being parallel to or coincide with the longitudinal axis of the elongate bridge,
wherein the extendable arrangement comprises:
a first pulley rotatably coupled to a first end portion of the elongate bridge in a manner so as to be rotatable about a first rotational axis perpendicular to the extension axis,
a second pulley rotatably coupled to a second end portion of the elongate bridge in a manner so as to be rotatable about a second rotational axis perpendicular to the extension axis, the second rotational axis being parallel to the first rotational axis,
a continuous endless belt looped over the first pulley and the second pulley,
a first elongate member disposed parallel to the extension axis with a first end portion coupled to the first handle part and a second end portion coupled to a first segment of the continuous endless belt, and
a second elongate member disposed parallel to the extension axis with a first end portion coupled to the second handle part and a second end portion coupled to a second segment of the continuous endless belt, the first segment of the continuous endless belt and the second segment of the continuous endless belt being on opposite sides of the continuous endless belt across the extension axis.

13. The extendable controller as claimed in claim 12, wherein the extendable arrangement further comprises:
a first biasing element connected between the first handle part and the first end portion of the elongate bridge, the first biasing element being configured to bias against extending the first handle part from the elongate bridge along the extension axis, and
a second biasing element connected between the second handle part and the second end portion of the elongate bridge, the second biasing element being configured to bias against extending the second handle part from the elongate bridge along the extension axis.

14. The extendable controller as claimed in claim 13, wherein each of the first biasing element and the second biasing element is a tension spring or extension spring.

15. The extendable controller as claimed in claim 12, wherein the first segment of the continuous endless belt comprises an interlocking arrangement and the second end portion of the first elongate member comprises a complementary interlocking arrangement, wherein the interlocking arrangement of the first segment of the continuous endless belt and the complementary interlocking arrangement of the first elongate member are interlocked with each other so as to couple the second end portion of the first elongate member to the first segment of the continuous endless belt,
wherein the second segment of the continuous endless belt comprises an interlocking arrangement and the second end portion of the second elongate member comprises a complementary interlocking arrangement, wherein the interlocking arrangement of the second segment of the continuous endless belt and the complementary interlocking arrangement of the second elongate member are interlocked with each other so as to couple the second end portion of the second elongate member to the second segment of the continuous endless belt,
wherein the interlocking arrangement of the first segment of the continuous endless belt comprises a protrusion and the complementary interlocking arrangement of the first elongate member comprises a notch, and
wherein the interlocking arrangement of the second segment of the continuous endless belt comprises a protrusion and the complementary interlocking arrangement of the second elongate member comprises a notch.

16. The extendable controller as claimed in claim 12, wherein the continuous endless belt is a toothed belt, and wherein each of the first pulley and the second pulley is a toothed pulley.

17. The extendable controller as claimed in claim 12, further comprising
a first guide pin disposed at the first end portion of the elongate bridge,
a second guide pin disposed at the second end portion of the elongate bridge,
wherein the first elongate member comprises an elongate slot extending longitudinally along a length of the first elongate member, and the first guide pin is fitted through the elongate slot of the first elongate member to guide a longitudinal movement of the first elongate member, and
wherein the second elongate member comprises an elongate slot extending longitudinally along a length of the second elongate member, and the second guide pin is fitted through the elongate slot of the second elongate member to guide a longitudinal movement of the second elongate member.

18. The extendable controller as claimed in claim 12, wherein the first bridge-link-portion is of a sleeve-like structure fitted over the first half of the elongate bridge, wherein the second bridge-link-portion is of a sleeve-like structure fitted over the second half of the elongate bridge.

19. The extendable controller as claimed in claim 12, further comprising an electrical cable extending between the first handle part and the second handle part, wherein the electrical cable extends along the first bridge-link-portion, the elongate bridge and the second bridge-link-portion, or wherein the electrical cable comprises a flexible flat cable, a flexible cable, a ribbon cable, a coaxial cable, or a wire.

* * * * *